(12) United States Patent
Yasui et al.

(10) Patent No.: US 9,096,275 B2
(45) Date of Patent: Aug. 4, 2015

(54) VEHICLE BODY STRUCTURE

(75) Inventors: Ken Yasui, Wako (JP); Hitoshi Mizohata, Wako (JP); Eisei Higuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 322 days.

(21) Appl. No.: 13/878,853

(22) PCT Filed: Oct. 26, 2011

(86) PCT No.: PCT/JP2011/074630
§ 371 (c)(1),
(2), (4) Date: Apr. 11, 2013

(87) PCT Pub. No.: WO2012/060257
PCT Pub. Date: May 10, 2012

(65) Prior Publication Data
US 2013/0200653 A1 Aug. 8, 2013

(30) Foreign Application Priority Data

Nov. 1, 2010 (JP) .................................. 2010-245265
Nov. 1, 2010 (JP) .................................. 2010-245335

(51) Int. Cl.
*B62D 21/15* (2006.01)
*B62D 21/11* (2006.01)
*B62D 25/20* (2006.01)

(52) U.S. Cl.
CPC ................ *B62D 21/15* (2013.01); *B62D 21/11* (2013.01); *B62D 21/155* (2013.01); *B62D 25/20* (2013.01)

(58) Field of Classification Search
CPC ...... B62D 21/15; B62D 21/11; B62D 21/155; B62D 25/20
USPC ............. 296/187.09, 187.08, 193.07, 193.09, 296/203.02, 30, 204; 180/299
See application file for complete search history.

(56) References Cited

U.S. PATENT DOCUMENTS

| 2001/0013711 A1* | 8/2001 | Motozawa et al. ........... 296/68.1 |
| 2006/0255625 A1* | 11/2006 | Kitoh et al. .................... 296/204 |
| 2006/0278463 A1* | 12/2006 | Anzai et al. .................... 180/312 |

(Continued)

FOREIGN PATENT DOCUMENTS

| JP | S61-119871 | 7/1986 |
| JP | 2005-112197 | 4/2005 |

(Continued)

*Primary Examiner* — Jason S Morrow
*Assistant Examiner* — E Turner Hicks
(74) *Attorney, Agent, or Firm* — Rankin, Hill & Clark LLP

(57) ABSTRACT

A vehicle body includes: left and right floor frames for supporting a floor panel; left and right side-frames extending from the vicinities of ends of the left and right floor frames in the front-rear direction so as to be separated in the front-rear direction of the vehicle body from the left and right floor frames; and a subframe provided below the left and right side-frames. Left and right bulkheads and left and right collar sections of a hollow shape, which are provided to the left and right bulkheads, are provided within the left and right floor frames. The subframe has left and right subframe end sections extending toward end sections of the left and right floor frames. The left and right subframe end sections are connected to the left and right collar sections by left and right connection members so as to be able to swing vertically.

16 Claims, 28 Drawing Sheets

(56) References Cited

U.S. PATENT DOCUMENTS

2009/0058134 A1* 3/2009 Hiraishi et al. .......... 296/187.09
2012/0056447 A1* 3/2012 Yoshida .................. 296/193.09

FOREIGN PATENT DOCUMENTS

| JP | 2005-247091 | 9/2005 |
| JP | 2009-090861 | 4/2009 |

* cited by examiner

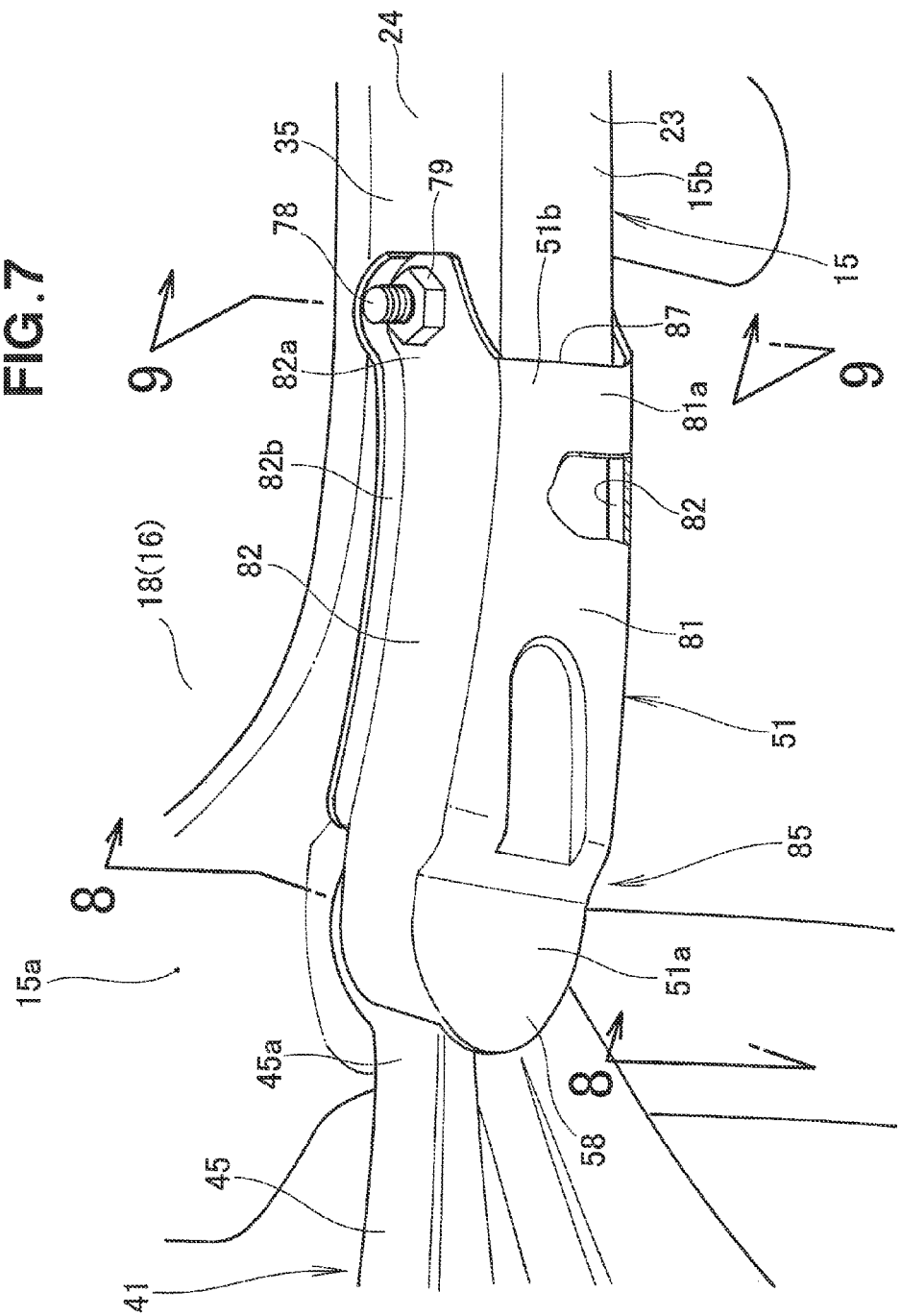

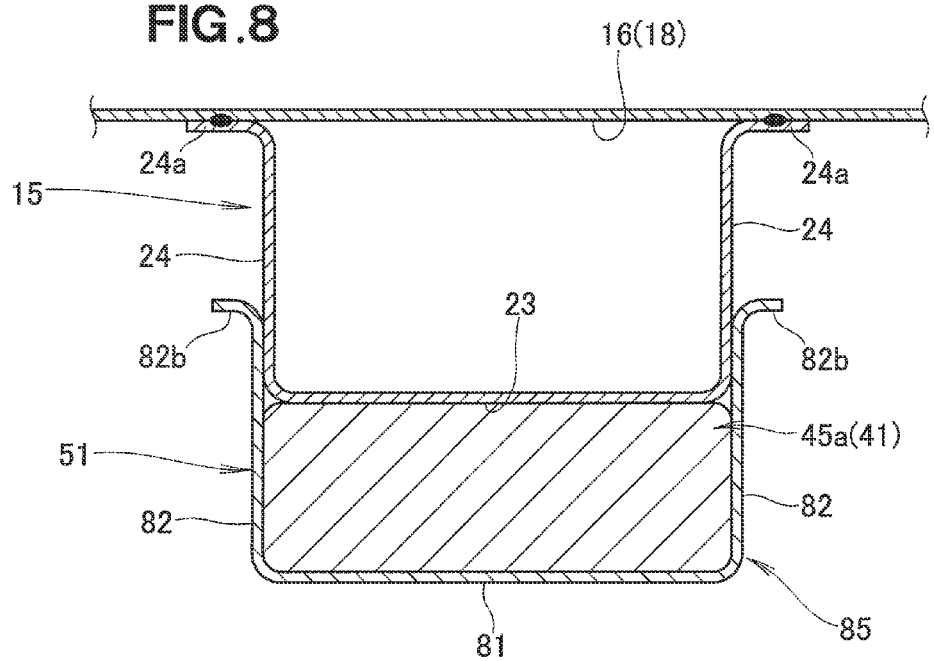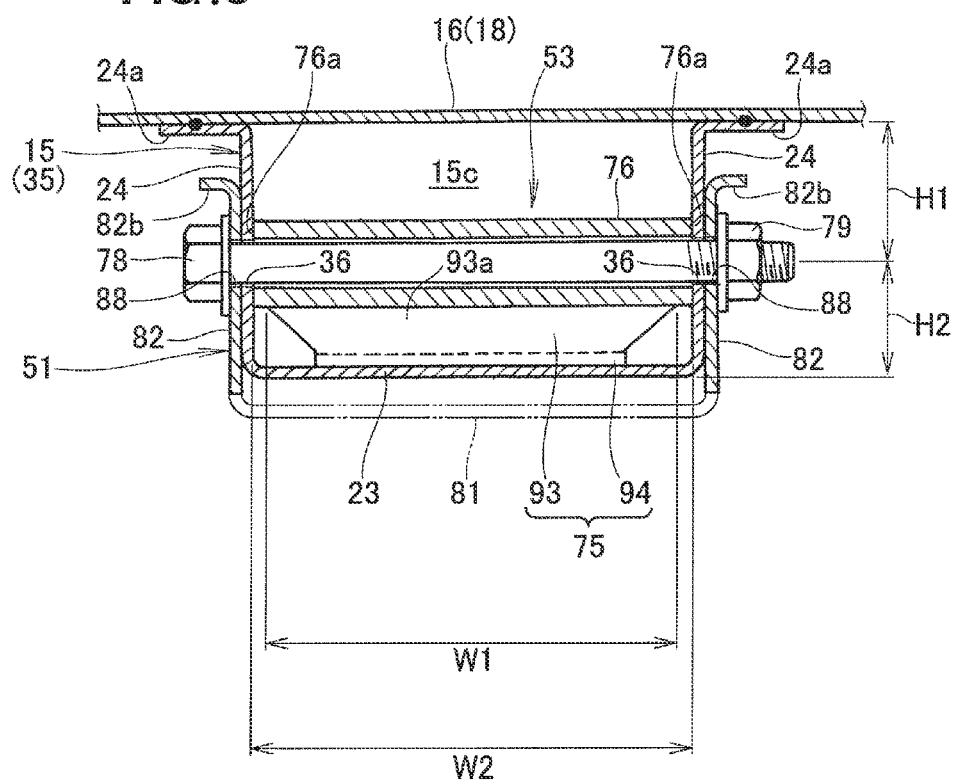

VEHICLE BODY STRUCTURE

TECHNICAL FIELD

The present invention relates to a vehicle body structure improved to efficiently absorb a collision force from the front surface or rear surface of the vehicle body.

BACKGROUND ART

In recent years, development has been under way of techniques for absorbing a collision force input from the front of a vehicle by means of the vehicle body at the time of so-called frontal collision where the collision force acts on the front surface of the vehicle. For example, as a collision force from the front surface is input to the front ends of left and right front side frames, the left and right front side frames buckle to absorb the collision force. It is preferable that progress of the buckling of the left and right front side frames be not hampered by a sub frame. From Patent Literature 1, a different type of technique is known which causes a sub frame to be detached from the left and right front side frames in response to input of a collision force.

In a front section of the vehicle body disclosed in Patent Literature 1, the left and right front side frames are disposed forwardly of, or in front of, a lower dashboard panel partitioning the vehicle body in a front-rear direction. An engine is mounted between the left and right front side frames, and the sub frame for mounting a steering apparatus is disposed immediately rearwardly of, or behind, the engine. The sub frame has a rear end portion superposed from below the lower surfaces of rear end portions of the left and right front side frames and vertically tightened by means of bolts and nuts. The nuts can be detached from the left and right front side frames when a predetermined load has acted thereon. Namely, the rear end portion of the sub frame is mounted to the rear end portions of the left and right front side frames in such a manner that it can be detached in response to the predetermined load having acted thereon.

When a frontal collision of the vehicle has occurred, a collision force from the front causes the left and right front side frames to buckle toward the rear of the vehicle body. As the buckling of the left and right front side frames progresses, the collision force from the front transmits from the left and right front side frames to the engine. Then, the engine moves toward the rear of the vehicle body to collide against the subframe. As a consequence, the sub frame is detached from the left and right front side frames, so that the engine can move further toward the rear of the vehicle body. Thus, the collision force from the front can be absorbed by the buckling of the left and right front side frames further progressing due to the collision force.

In the case of such a sub frame, there is a need to take into consideration a possibility of occurrence of a so-called bending phenomenon where, upon receipt of the collision force, the rear end portion of the subframe bends downward at its halfway region in the front-rear direction before being detached from the left and right front side frames. If such a bending phenomenon occurs, the lower dashboard panel would receive the collision force from the rear end portion of the sub frame when the rear end portion of the sub frame has hit the lower dashboard panel. Because a passenger compartment is located behind the lower dashboard panel, it is preferable that the collision force transmitted from the sub frame to the lower dashboard panel be suppressed as much as possible.

PRIOR ART LITERATURE

Patent Literature 1: Japanese Patent No. 4325351

SUMMARY OF INVENTION

Technical Problem

It is therefore an object to provide a technique which, when a collision force has acted on the front surface or rear surface of the vehicle in the front-rear direction of the vehicle body, can not only absorb the collision force without buckling of the left and right side frames being hampered by the sub frame but also prevent the collision force from transmitting from the sub frame to the lower dashboard panel.

Solution to Problem

According to claim 1 of the instant application, there is provided a vehicle body structure comprising: left and right floor frames extending in a front-rear direction of a vehicle body for supporting a floor panel; left and right side frames extending in the front-rear direction of the vehicle body away from near respective one end portions, in the front-rear direction, of the left and right floor frames; and a sub frame disposed underneath the left and right side frames, which is characterized in that the left and right floor frames each have a generally U cross-sectional shape and each include a floor frame bottom section and a pair of floor frame side wall sections projecting upward from opposite side ends, in a vehicle width direction, of the floor frame bottom section, the left and right floor frames each include, in an interior space of the generally U cross-sectional shape, a left or right bulkhead projecting upward from the floor frame bottom section, and a left or right collar section of a hollow shape provided on the left or right bulkhead and extending in the vehicle width direction, the sub frame includes left and right sub-frame one end sections extending toward the one end portions of the left and right floor frames, the left and right sub-frame one end sections each have a generally U cross-sectional shape and include a sub frame bottom section and a pair of sub frame side wall sections projecting upward from opposite side ends, in the vehicle width direction, of the sub frame bottom section, and the pair of sub frame side wall sections of each of the left and right sub-frame one end sections are fitted over the pair of floor frame side wall sections of the left or right floor frame, but also connected to the pair of floor frame side wall sections of the left or right floor frame, by means of a connection member passed through the collar section of the left or right floor frame, in such a manner that the pair of sub frame side wall sections are pivotable in an up-down direction of the vehicle body.

Preferably, as recited in claim 2, the left and right bulkheads each have a lower end joined to the floor frame bottom section of the left or right floor frame, and the left and right collar sections are each joined to an upper end of the left or right bulkhead.

Preferably, as recited in claim 3, the sub frame bottom section of each of the left and right sub-frame one end sections has a distal end portion opposed to the one end portion of the left or right floor frame, the distal end portion being recessed.

Preferably, as recited in claim 4, the vehicle body structure of the present invention further comprises a lower dashboard panel disposed in front of the floor panel for partitioning the vehicle body in the front-rear direction. The lower dashboard panel includes a vertically oriented partition plate formed to partition the vehicle body in the front-rear direction, and a slanting plate slanting rearwardly and downwardly from the lower end of the partition plate. The sub frame includes, on front and rear portions thereof, front and rear fragile parts capable of bending downwardly of the vehicle body by a collision force input from a front of the vehicle body toward a rear of the vehicle body, and the sub frame is disposed in front of the lower dashboard panel and includes, between the front and rear fragile parts, a mount section capable of mounting thereon an electric power steering gearbox disposed in front of the slanting plate and a power unit disposed in front of the gearbox.

Preferably, as recited in claim 5, the slanting plate has a lower end joined to a front end portion of the floor panel, the left and right floor frames extend from their respective front end portions, joined to the slanting plate, toward the rear of the vehicle body along a lower surface of the floor panel, and the left and right collar sections are located near the front end portions of the left and right floor frames.

Preferably, as recited in claim 6, the left and right sub-frame one end sections comprise left and right separated members that are separated from the sub frame in the front-rear direction of the vehicle body, the left and right separated members have through-holes formed in the sub frame bottom sections of left and right end sections separated from the sub frame, the left and right end sections are fastened to the sub frame by means of fastener members inserted through the through-holes of the left and right separated members, and the through-holes of the left and right separated members are sized to be displaceable at least in the vehicle width direction relative to corresponding ones of the fastener members.

Advantageous Effects of Invention

In the invention recited in claim 1, the sub frame includes the left and right sub-frame one end sections extending toward the one end portions of the left and right floor frames, respectively. The left and right floor frames, each having a generally U cross-sectional shape, each include the floor frame bottom section and the pair of floor frame side wall sections. The left and right floor frames each include, in the interior space of the generally U cross-sectional shape, the left or right collar section extending in the vehicle width direction. The left and right sub-frame one end sections each have a generally U cross-sectional shape and include the sub frame bottom section and the pair of sub frame side wall sections. The pair of sub frame side wall sections of each of the left and right sub-frame one end sections are fitted over the pair of floor frame side wall sections of the left or right floor frame, but also connected to the pair of floor frame side wall sections of the left or right floor frame, by means of the connection member passed through the collar section of the left or right floor frame, in such a manner that the pair of sub frame side wall sections are pivotable in the vertical or up-down direction of the vehicle body.

Thus, in response to a collision force, input to the vehicle from the front or back of the vehicle, transmitting to the sub frame, the left and right sub-frame one end sections can greatly pivot downwardly of the vehicle body about the connection members extending in the vehicle width direction; namely, the left and right sub-frame one end sections pivots downward below the left and right floor frames. Thus, buckling action of the left and right side frames responsive to the collision force would not be hampered by the sub frame. In addition, the present invention can secure a sufficient buckling range where the left and right side frames can buckle in response to the collision force. By buckling in an appropriate manner like this, the left and right side frames can sufficiently absorb the collision force. Further, because the sub frame is greatly pivotable in the downward direction of the vehicle body about the connection members, the sub frame would not collide against the lower dashboard panel. In this way, the present invention can prevent the collision force from transmitting from the sub frame to a lower dashboard panel.

Further, in the invention recited in claim 1, the left or right collar section extending in the vehicle width direction is located in the interior space of the generally U cross-sectional shape of each of the left and right floor frame. Thus, the pair of frame side wall sections can be supported by the collar section against bending into the interior space of the floor frame.

In the invention recited in claim 2, the left and right collar sections are each joined to the upper end of the left or right bulkhead, and the left and right bulkheads each have its lower end joined to the floor frame bottom section of the left or right floor frame. The left and right floor frames have a high rigidity by the floor frame bottom sections being reinforced with the left and right bulkheads. The high-rigidity left and right floor frames can sufficiently pivotably support the left and right sub-frame one end sections via the left and right connection members passed through the left and right collar sections. Thus, the sub frame can pivot in the downward direction of the vehicle body in response to the collision force, input from the front or back of the vehicle, with an even higher reliability. The present invention can secure a sufficient buckling range where the left and right side frames can buckle in response to the collision force. The left and right side frames can sufficiently absorb the collision force by sufficiently buckling in response to the collision force. Further, even when the left and right sub-frame one end sections hit the left and right floor frames during downward pivoting movement of the sub frame, deformation of the left and right floor frames can be suppressed because the left and right floor frames have a high rigidity. Thus, the present invention can suppress the input collision force from transmitting from the sub frame to the lower dashboard panel via the left and right floor frames.

In the invention recited in claim 3, the sub frame bottom section of each of the left and right sub-frame one end sections has the distal end portion opposed to the one end portion of the left or right floor frame, and the distal end portion is recessed. Thus, as the sub frame pivots downward about the left and right connection members, the left and right sub frame bottom sections would not hit the one end portions of the left and right floor frames. Thus, the collision force input to the sub frame can be greatly absorbed by the sub frame pivoting greatly.

In the invention recited in claim 4, the sub frame includes the front and rear fragile parts, and the mount section disposed between the front and rear fragile parts. The front and rear fragile parts are bendable in the downward direction of the vehicle body in response to the collision force input from the front of the vehicle body. The power unit can be mounted on a front portion of the mount, while an electric power steering gearbox can be mounted on a rear portion of the mount. Thus, as the left and right side frames buckle in response to the collision force, the front and rear fragile parts bend downward, but also the left and right sub-frame one end sections pivot downward about the connection members. As a consequence, the electric power steering gearbox is guided rearwardly and downwardly of the vehicle body. Namely, because the gearbox moves, or is displaced, rearwardly and downwardly, it can greatly move, or can be greatly displaced, without hitting the slanting plate. Thus, the sub frame and the left and right side frames having received the collision force can greatly deform to thereby greatly absorb the collision force. Besides, because the electric power steering gearbox is guided rearwardly and downwardly of the vehicle body, the present invention can even more effectively prevent the collision force from being input via the sub frame to the lower dashboard panel.

In the invention recited in claim 5, the slanting plate of the lower dashboard panel has its lower end joined to the front end portion of the floor panel. Thus, rigidity at and around a corner portion between the slanting plate and the substantially horizontal floor panel is great. The left and right floor frames extend from the front end portions, joined to the slanting plate, toward the rear of the vehicle body along the lower surface of the floor panel. The left and right collar sections are located near the front end portions of the left and right floor frames. Namely, the left and right collar sections are located in the neighborhood of the high-rigidity corner portion. Thus, the left and right sub-frame one end sections are vertically pivotably connected to regions of the left and right floor frames near the front end portions, i.e. near the high-rigidity corner portion. Thus, of the left and right floor frames, the regions having the left and right sub-frame one end sections vertically pivotably connected thereto have a great rigidity. Because the left and right sub-frame one end sections can be supported sufficiently by the high-rigidity regions of the left and right floor frames, the present invention can enhance operating stability of the vehicle, i.e. traveling stability of the vehicle.

In the invention recited in claim 6, the left and right sub-frame one end sections comprise left and right separated members that are separated from the sub frame in the front-rear direction of the vehicle body. Because the left and right sub-frame one end sections are separated from the sub frame, the sub frame can be reduced in size. Further, the through-holes are formed in the left and right end sections separated from the sub frame. The left and right end sections are fastened to the sub frame by means of fastener members inserted through the left and right through-holes. The left and right through-holes are sized, or set to a size, such that they are movable or displaceable relative to the left and right fastener members at least in the vehicle width direction. Thus, the present invention can absorb size tolerance, in the vehicle width direction, of the left and right separated members to the sub frame. Thus, the left and right separated members can be readily assembled to the sub frame.

BRIEF DESCRIPTION OF DRAWINGS

FIG. 7 is a view showing in enlarged scale a section encircled at 7 in FIG. 6;

FIG. 8 is a sectional view taken along line 8-8 of FIG. 7;

FIG. 9 is a sectional view taken along line 9-9 of FIG. 7;

DESCRIPTION OF EMBODIMENTS

Now, a description will be given about embodiments of the present invention with reference to the accompanying drawings.

Embodiment 1

Figure 1:
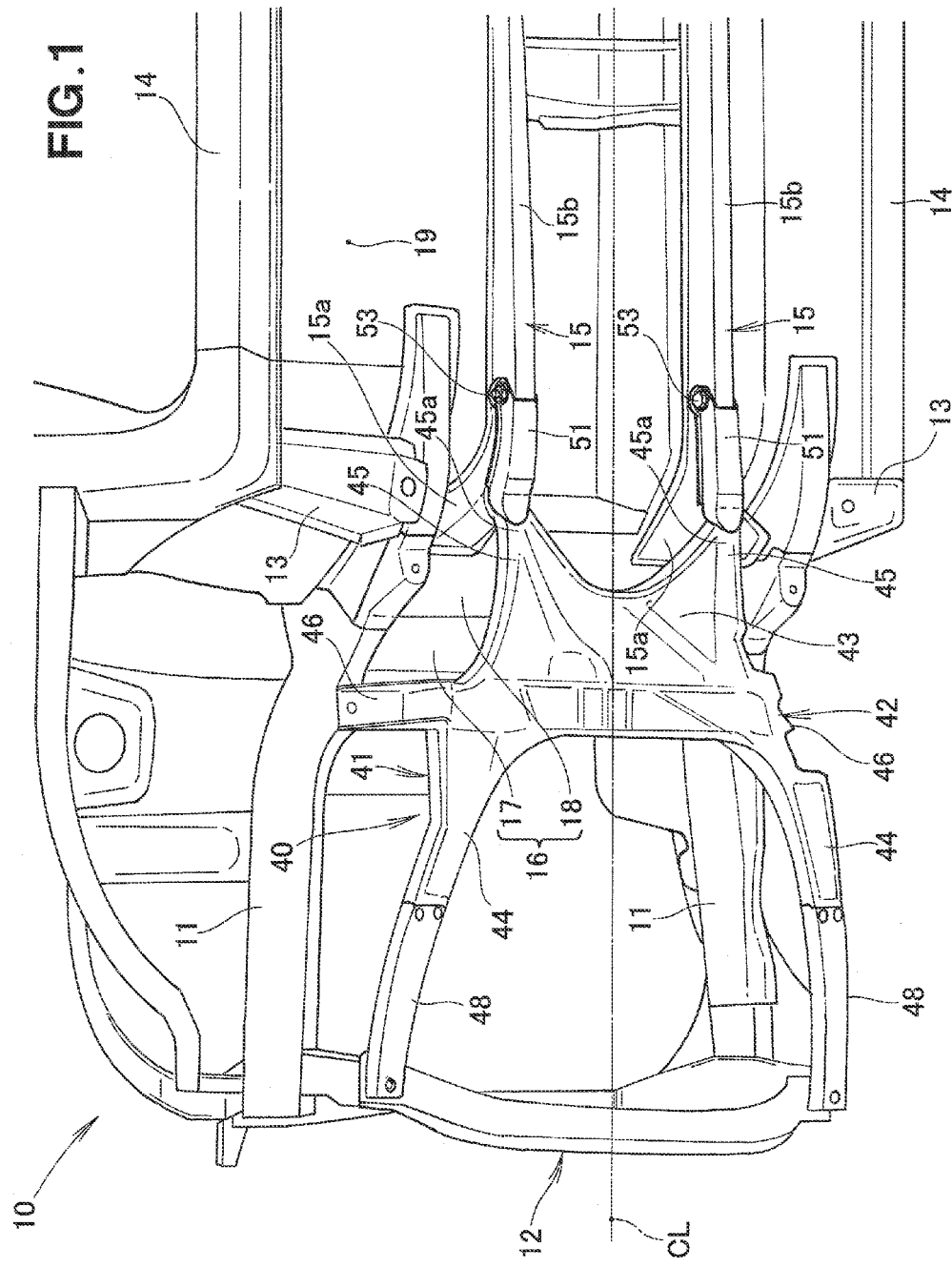
FIG. 1 is a bottom perspective view showing a front section of a vehicle body in a first embodiment of the present invention.
Figure 2:
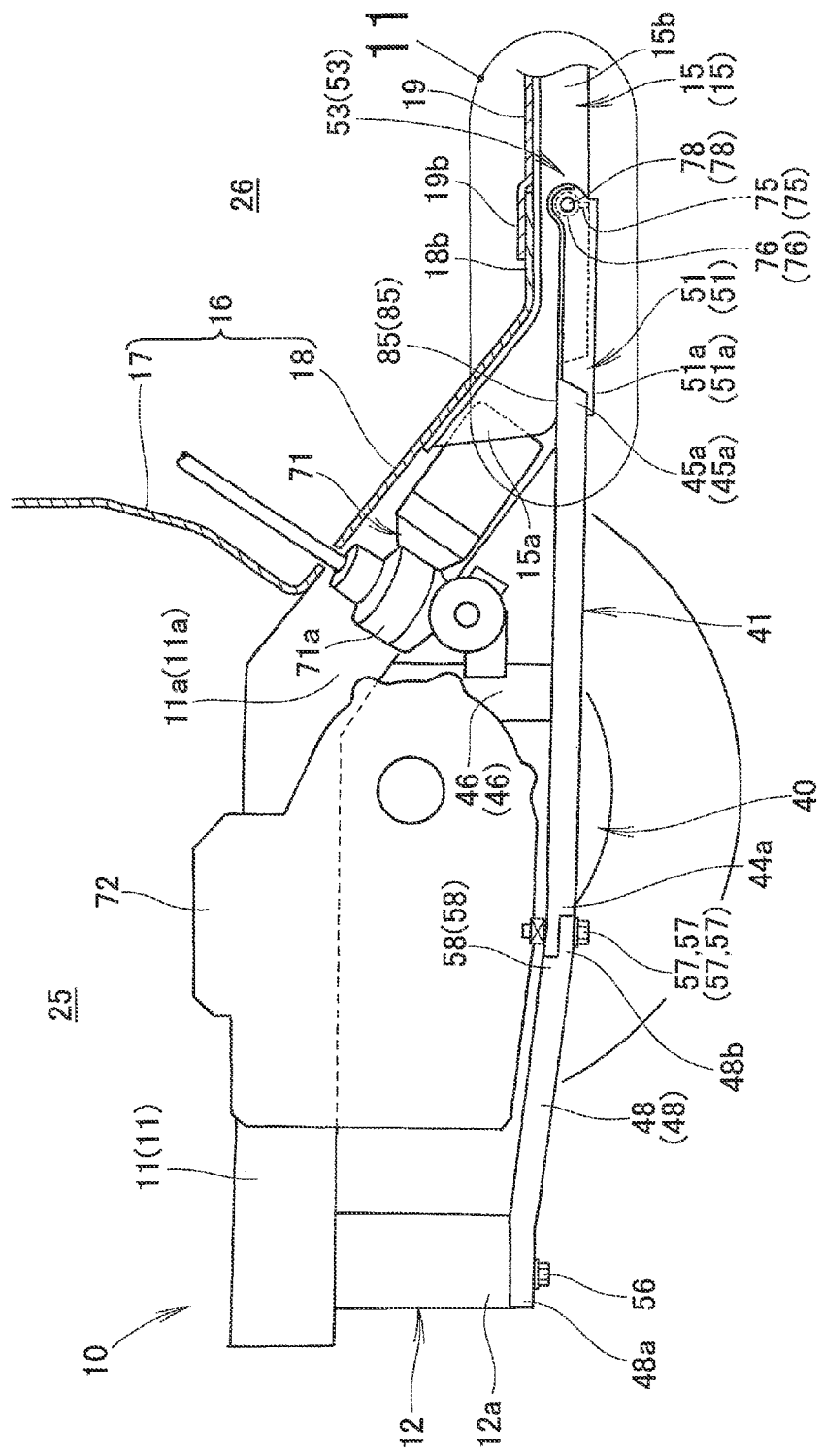
FIG. 2 is a left side sectional view showing relationship between a left floor frame, a sub frame and a lower dashboard panel shown in FIG. 1.
Figure 3:
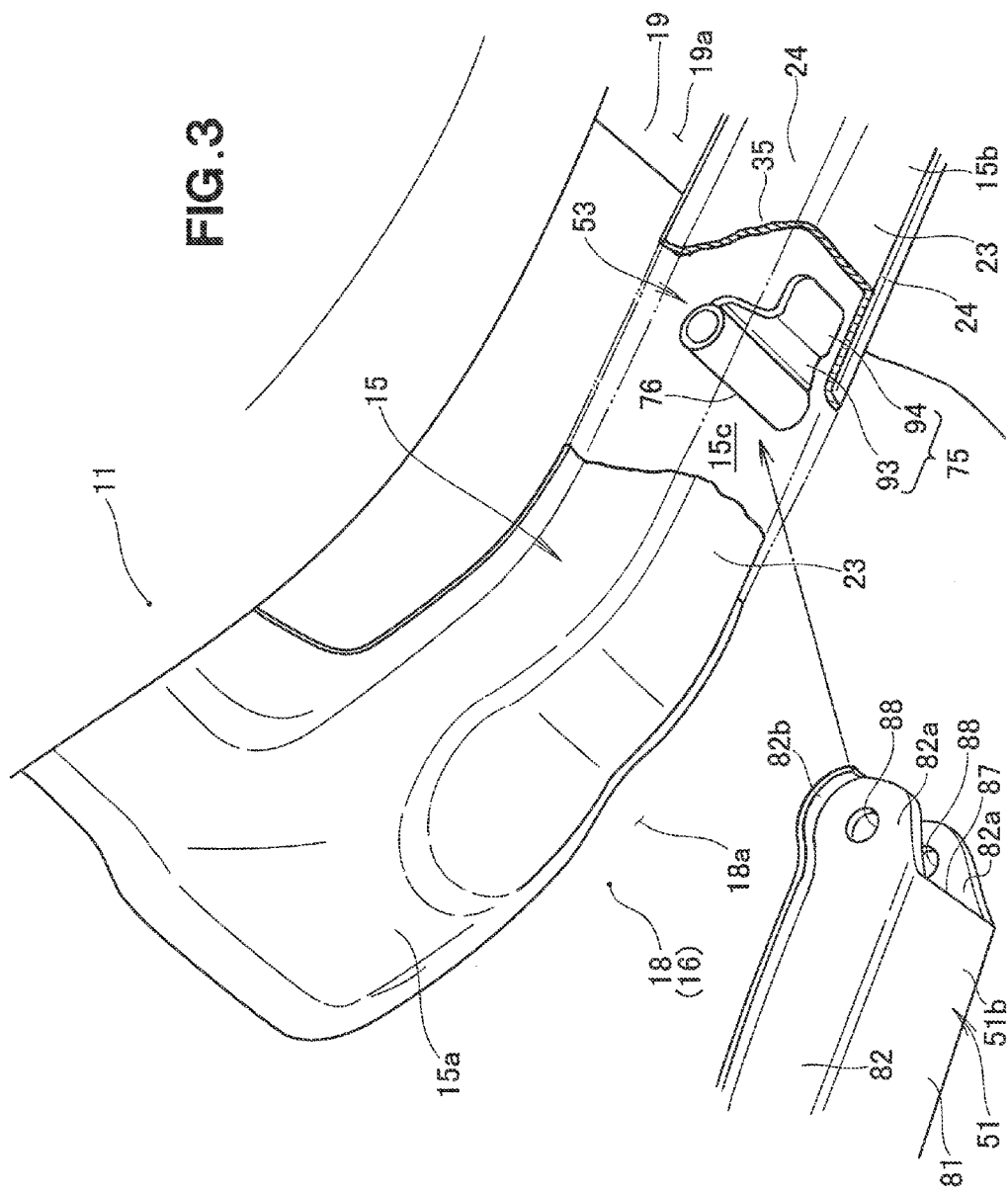
FIG. 3 is an exploded view showing relationship between the left floor frame and a left sub-frame one end section shown in FIG. 2.

The following describe a first embodiment of a vehicle body structure of the present invention. As shown in FIGS. 1 to 3, a vehicle body 10 in the first embodiment is of a monocoque type body popularly employed in various vehicles, such as passenger cars, and formed in left-right symmetry with respect to a centerline CL extending in a front-rear direction of the vehicle body centrally across the width of the vehicle. Inside the vehicle body 10, a power unit accommodating compartment 25 is provided in a front section of the vehicle body 10, and a passenger compartment 26 located immediately rearwardly of, or immediately behind, the power unit accommodating compartment 25.

The vehicle body 10 includes: left and right floor frames 15 extending in the front-rear direction of the vehicle body 10 to support a floor panel 19; left and right side frames 11 extending in the front-rear direction of the vehicle body from near respective one end portions 15a, in the front-rear direction, of the left and right floor frames 15 (front end portions 15a of the floor frames 15 in the illustrated example) and away from the left and right floor frames 15; and a sub frame 41 disposed underneath the left and right side frames 11.

The following details the embodiment of the present invention in relation to the case where the left and right side frames 11 and the sub frame 41 are disposed in the "front section" of the vehicle body 10. Note that, in a case where the left and right side frames 11 and the sub frame 41 are disposed in a "rear section" of the vehicle body 10, a construction and behavior of the left and right side frames 11 and the sub frame 41 are substantially the same as those in the case where the left and right side frames 11 and the sub frame 41 are disposed in the front section of the vehicle body 10.

As shown in FIGS. 1 to 3, a front half section of the vehicle body 10 includes: the left and right side frames 11 (front side frames 11); a front bulkhead 12; left and right outriggers 13; left and right side sills 14; the left and right floor frames 15; a lower dashboard panel 16; and the floor panel 19.

The left and right side frames 11 are located on left and right sides of the front section of the vehicle body 10 and extend in the front-rear direction of the vehicle body 10. Rear end portions 11a of the left and right side frames 11 slant rearwardly and downwardly.

The front bulkhead 12 is provided between the respect front ends of the left and right side frames 11.

The left and right outriggers 13 extend from the rear end portions 11a of the left and right side frames 11, outwardly in the vehicle width direction, to the left and right side sills 14.

The left and right side sills 14 are members located on left and right sides of a middle section (i.e. a section located rearward of the lower dashboard panel 16) of the vehicle body 10, and the left and right side sills 14 extend toward the rear of the vehicle body from outer end portions, in the vehicle width direction, of the left and right outriggers 13.

The left and right floor frames 15 are members located underneath the passenger compartment 26 for supporting the floor panel 19. The left and right floor frames 15 extend from the rear end portions 11a of the left and right side frames 11 toward the rear of the vehicle body while slanting toward the centerline extending centrally across the width of the vehicle body.

As shown in FIGS. 1 and 2, the lower dashboard panel 16 is a partition wall that is located rearwardly of the left and right side frames 11 to partition the vehicle body 10 in the front-rear direction, i.e. partition between the front power unit accommodating compartment 25 and the rear passenger compartment 26. The lower dashboard panel 16 comprises an upper half section formed as a vertically oriented partition plate 17, and a lower half section formed as a slanting plate 18. The partition plate 17 is a substantially vertical member disposed over the rear end portions 11a of the left and right side frames 11 and formed to partition the vehicle body 10 in the front-rear direction.

The slanting plate 18 extends from the lower end of the partition plate 17 rearwardly and downwardly along slanting upper surfaces of the rear end portions 11a of the left and right side frames 11. A substantially horizontal flat flange 18b is formed integrally with the lower end of the slanting plate 18 to extend rearward therefrom. The flange 18b is superposed, from below, on the lower surface of a front end portion 19b of the floor panel 19 and joined to the front end portion 19b of the floor panel 19.

The floor panel 19, which is a member of a generally flat plate shape constituting a floor of the passenger compartment 26, extends between the left and right side sills 14 and is superposed on and joined to the upper surfaces of the left and right floor frames 15.

The following describe in detail of the left floor frame 15. The right floor frame 15 is identical in construction to the left floor frame 15 except that it is symmetrical to the left floor frame 15 with respect the centerline CL extending centrally across the width of the vehicle, and thus description of the right floor frame 15 is omitted to avoid unnecessary duplication.

As shown in FIGS. 4 to 8, the left floor frame 15 is a component part formed by pressing a steel plate. More specifically, the left floor frame 15 is a member elongated in the front-rear direction of the vehicle body and includes the front end portion 15a constituting a front half portion thereof and a horizontal section 15b constituting a rear half portion thereof. The front end portion 15a is joined to the rear end portion 11a of the left side frame 11 (see FIG. 2). Further, the front end portion 15a slants rearwardly and downwardly along a slanting surface 18a of the slanting plate 18 facing the power unit accommodating compartment 25 and is joined to the slant surface 18a of the slanting plate 18. The horizontal section 15b extends from the rearwardly-and-downwardly slanting front end portion 15a horizontally toward the rear of the vehicle body. More specifically, the horizontal section 15b extends along and is joined to the flat flange 18b of the slanting plate 18 and the lower surface 19a of the floor panel 19.

Figure 4:
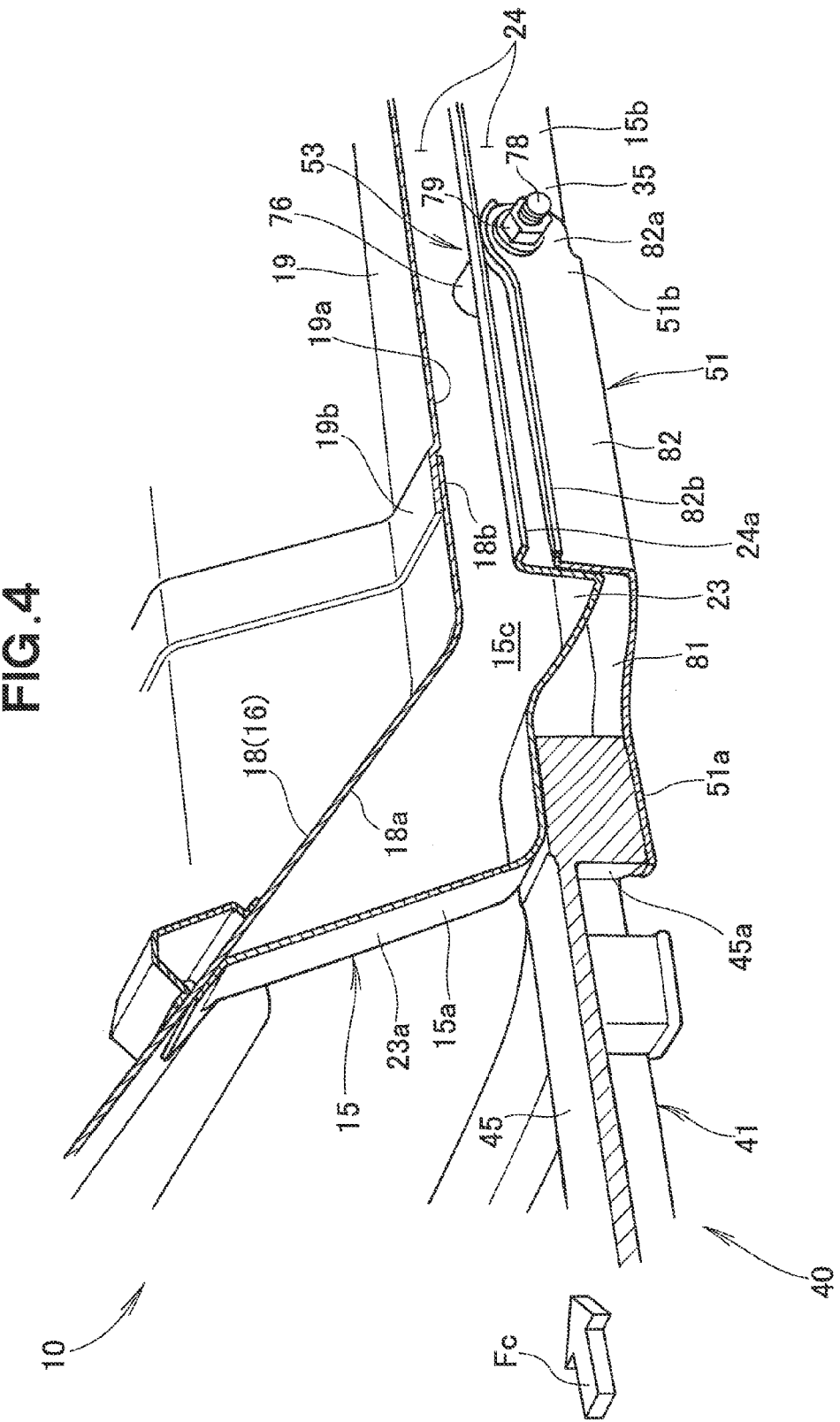
FIG. 4 is a partly broken-away view showing relationship between the left floor frame and the left sub-frame one end section shown in FIG. 2.

Further, as shown in FIGS. 3 to 5 and FIG. 8, the left floor frame 15 has a generally U cross-sectional shape opening toward the slanting plate 18 and the lower surface 19a of the floor panel 19. More specifically, the left floor frame 15 has a floor frame bottom section 23, and a pair of floor frame side wall sections 24 projecting upward from the opposite side ends, in the vehicle width direction, of the floor frame bottom section 23. A flange 24a is formed on the upper end (opening end) of each of the pair of floor frame side wall sections 24. As shown in FIGS. 4 and 8, the left floor frame 15 is joined at the flanges 24a of the floor frame side wall sections 24 to the slanting plate 18 and the floor panel 19, so that the left floor frame 15 is joined to the slanting plate 18 and the floor panel 19.

Figure 5:
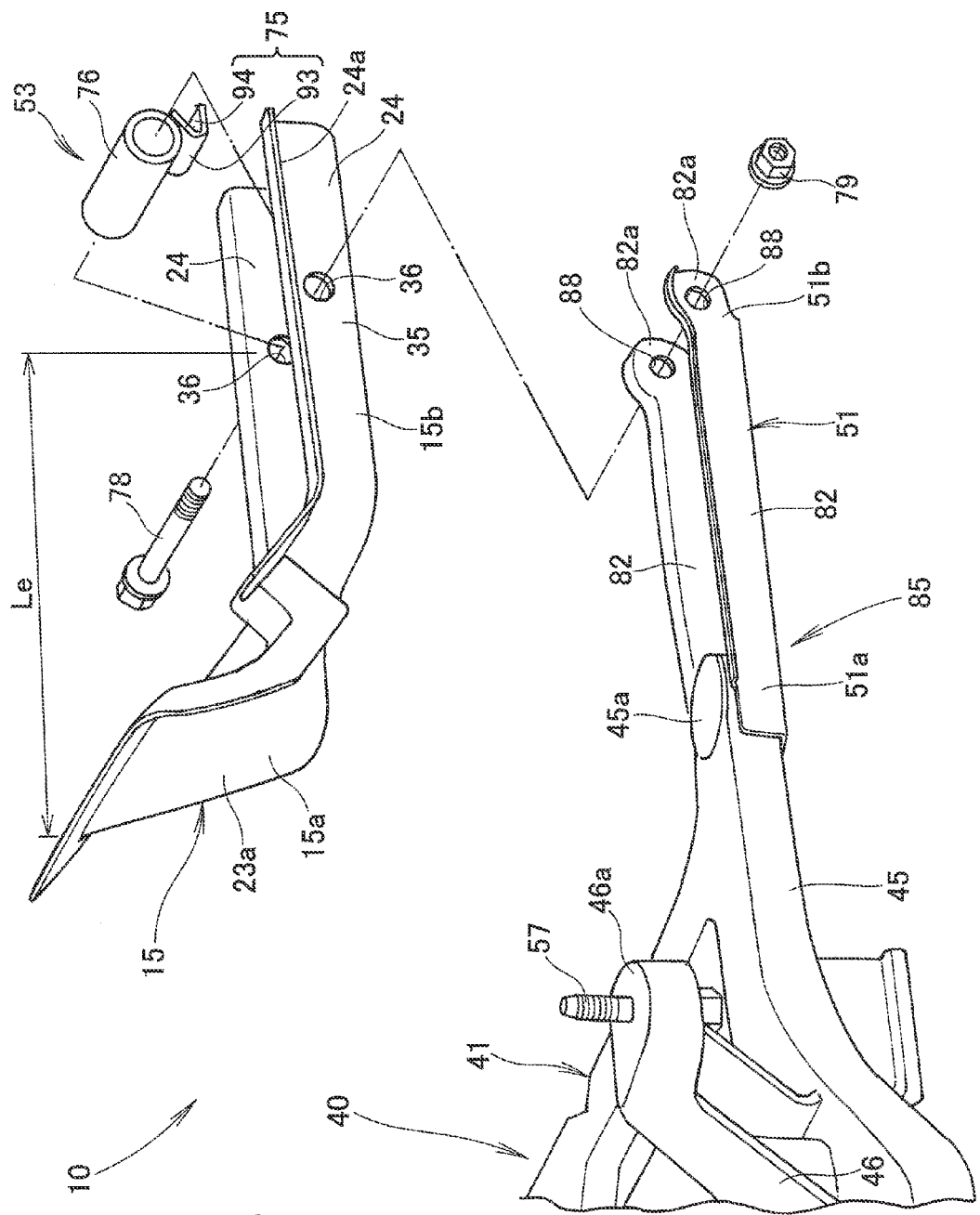
FIG. 5 is an exploded view showing the relationship between the left floor frame and the left sub-frame one end section shown in FIG. 4.

Further, as shown in FIGS. 5 and 9, the left floor frame 15 has a pair of through-holes 36 formed in predetermined support portions 35 (near the front end portion 15a) of the horizontal section 15b. More specifically, the pair of through-holes 36 (frame communicating holes 36) extend through the pair of floor frame side wall sections 24 in the vehicle width direction and are located in coaxial alignment with each other. As shown in FIG. 5, the position of the through-holes 36 (and hence the position of the support portions 35) is spaced rearwardly by a predetermined distance Le from the front end of the left front end portion 15a.

As shown in FIGS. 1 and 2, a sub frame unit 40 is provided in the front part of the vehicle body 10 and in front of the lower dashboard panel 16. The sub frame unit 40 includes the sub frame 41, and a gearbox 71a for an electric power steering 71 (electric power steering gearbox 71a) and a power unit 72 mounted on the sub frame 41.

The electric power steering 71 is an apparatus that assists steering force of a not-shown steering wheel by means of an electric motor. The electric power steering gearbox 71a is a member which is elongated in the vehicle width direction and located in front of the slanting plate 18, and which accommodates therein a gear mechanism that converts steering force of the steering wheel into steered force acting in a leftward or rightward direction of the vehicle body.

The power unit 72, which generates travel driving force of the vehicle, is constructed, for example, by integrally combining an engine and a transmission. The power unit 72 is located in front of the electric power steering gearbox 71a.

Figure 6:
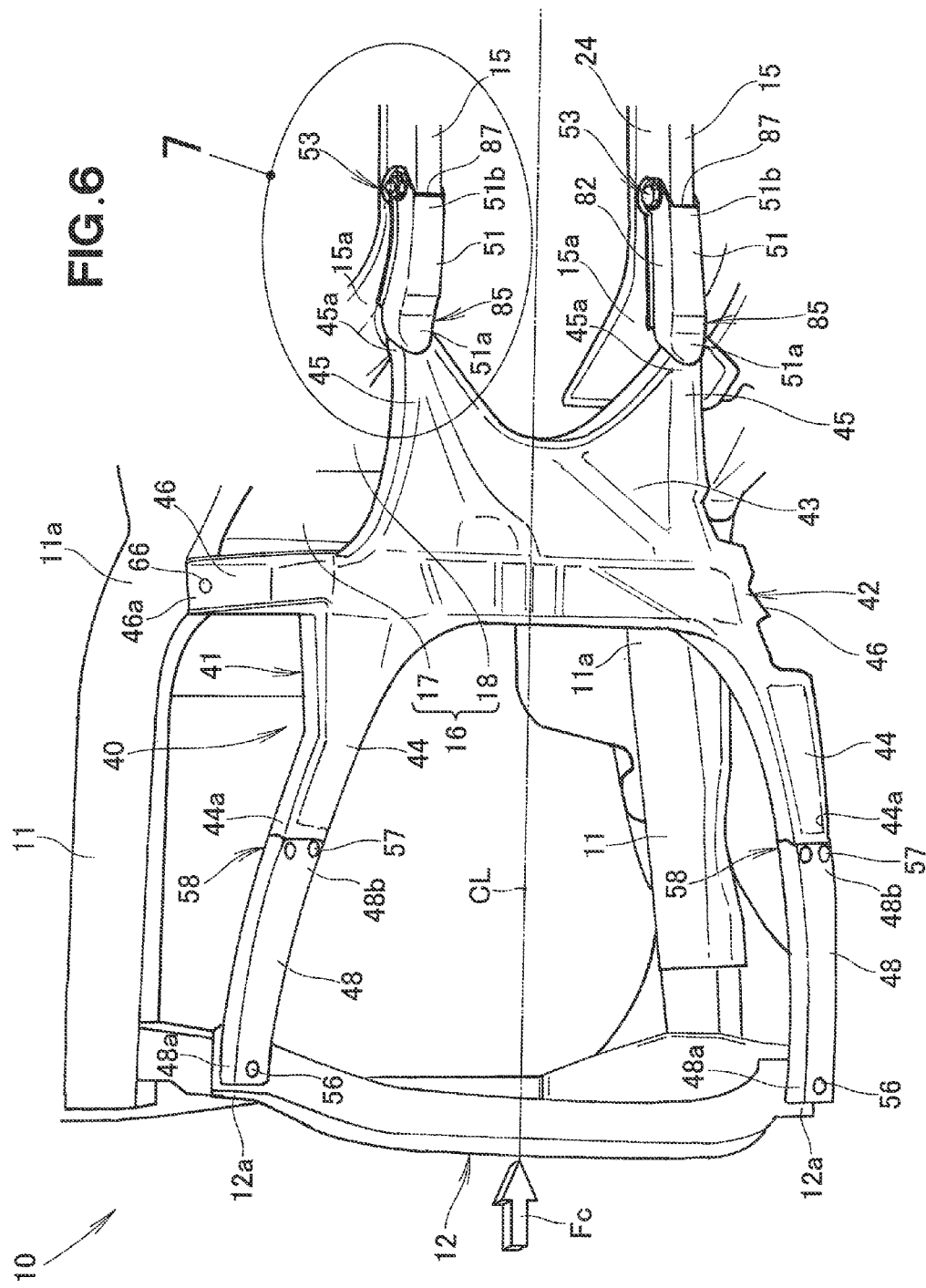
FIG. 6 is a bottom perspective view showing in enlarged scale principal elements in the front section of the vehicle body shown in FIG. 1.

As shown in FIGS. 1 and 6, the sub frame 41 is disposed in front of the lower dashboard panel 16 and underneath the left and right side frames 11. Namely, the sub frame 41 is connected to regions of the left and right side frames adjacent to the rear end portions 11a, to left and right lower end portions 12a of the front bulkhead 12, and to the front end portions 15a of the left and right floor frames 15. The sub frame 41 comprises a sub frame body 42, left and right front stays 48, and left and right rear stays 51.

The above-mentioned sub frame body 42 is an integral component part formed, for example, by die-casting, which includes: a mount section 43; left and right front mounting sections 44 extending from the left and right front ends of the mount section 43 toward the front of the vehicle body; left and right rear mounting sections 45 extending from the left and right rear ends of the mount section 43 toward the rear of the vehicle body; and left and right side mounting sections 46 extending from the left and right sides of the mount section 43 outwardly in the vehicle width direction.

The mount section 43 (frame base 43) is a member capable of mounting thereon the electric power steering gearbox 71a and the power unit 72.

Front end portions 44a of the left and right front mounting sections 44 are connected to the left and right lower end portions 12a of the front bulkhead 12. Namely, front end portions 48a of the left and right front stays 48 are vertically fastened to the left and right lower end portions 12a of the front bulkhead 12 by means of bolts and nuts 56. Rear end portions 48b of the left and right front stays 48 are vertically fastened to the front end portions 44a of the left and right front mounting sections 44 by means of bolts and nuts 57. The left and right front stays 48 are each, for example, a component part formed by pressing a steel plate and slightly slant rearwardly and downwardly from the front end portions 48a toward the rear end portions 48b.

A left end portion 46a of the left side mounting section 46 is vertically fastened to a region of the left side frame 11 adjacent to the rear end portion 11a. When a collision force Fc has been input to the vehicle body structure via the front end portion 48a of the left front stay 48, i.e. the front end portion 48a of the sub frame 41, toward the rear of the vehicle body, the left-side mounting section 46 is capable of breaking; for example, the bolt and nut 66 may break. As a consequence, the left side mounting section 46 can be detached from a region of the left side frame 11 adjacent to the rear end portion 11a. A mounting construction of the right side mounting section 46 is similar to that of the left side mounting section 46 and thus will not be described here to avoid unnecessary duplication.

Further, as shown in FIGS. 5 to 7, a front end portion 51a (proximal end portion 51a) of the left rear stay 51 is integrated with the sub frame body 42, for example, by being welded or integrally formed with a rear end portion 45a of the left rear mounting section 45. The left rear stay 51 extends from the rear end portion 45a of the left rear mounting section 45 toward the rear of the vehicle body and toward the front end portion 15a of the left floor frame 15. The right rear stay 51 is of the same construction as the left rear stay 51 and thus will not be described to avoid unnecessary duplication.

As set forth above, the sub frame 41 includes the left and right rear stays 51 extending from the rear end portions 45a of the left and right rear mounting sections 45 toward the one end sections 15a (front end sections 15a) of the left and right floor frames 15. The left and right rear stays 51 will hereinafter be sometimes referred to as "left and right sub-frame one end sections 51".

As shown in FIGS. 4 to 8, the left and right sub-frame one end sections 51 are each a member elongated in the front-rear direction and formed, for example, by pressing a steel plate. The left and right sub-frame one end sections 51 each have a generally U cross-sectional shape opening toward the lower surface 19a of the floor panel 19. More specifically, the left and right sub-frame one end sections 51 each have a sub frame bottom section 81, and a pair of sub frame side wall sections 82 projecting upward from the opposite side ends, in the vehicle width direction, of the sub frame bottom section 81. A flange 82b is formed on the upper end (opening end) of each of the pair of side wall sections 82.

As shown in FIG. 8, a distance between the sub frame side wall sections 82 is set such that the pair of sub frame side wall sections 82 can be fitted over the outer surfaces of the side wall sections 24 of the left floor frame 15. Preferably, the sub frame side wall sections 82 are constructed to be capable of sandwiching therebetween the outer surfaces of the floor frame side wall sections 24 with a predetermined sandwiching force, i.e. constructed to be capable of being press-fitted from below over the floor frame side wall sections 24. Thus, a predetermined frictional force occurs between the pair of sub frame side wall sections 82 and the pair of floor frame side wall sections 24. As shown in FIGS. 5 and 9, a pair of through-holes 88 are formed in respective one end portions 82a (rear end portions 82a) of the sub frame side wall sections 82.

Figure 10:
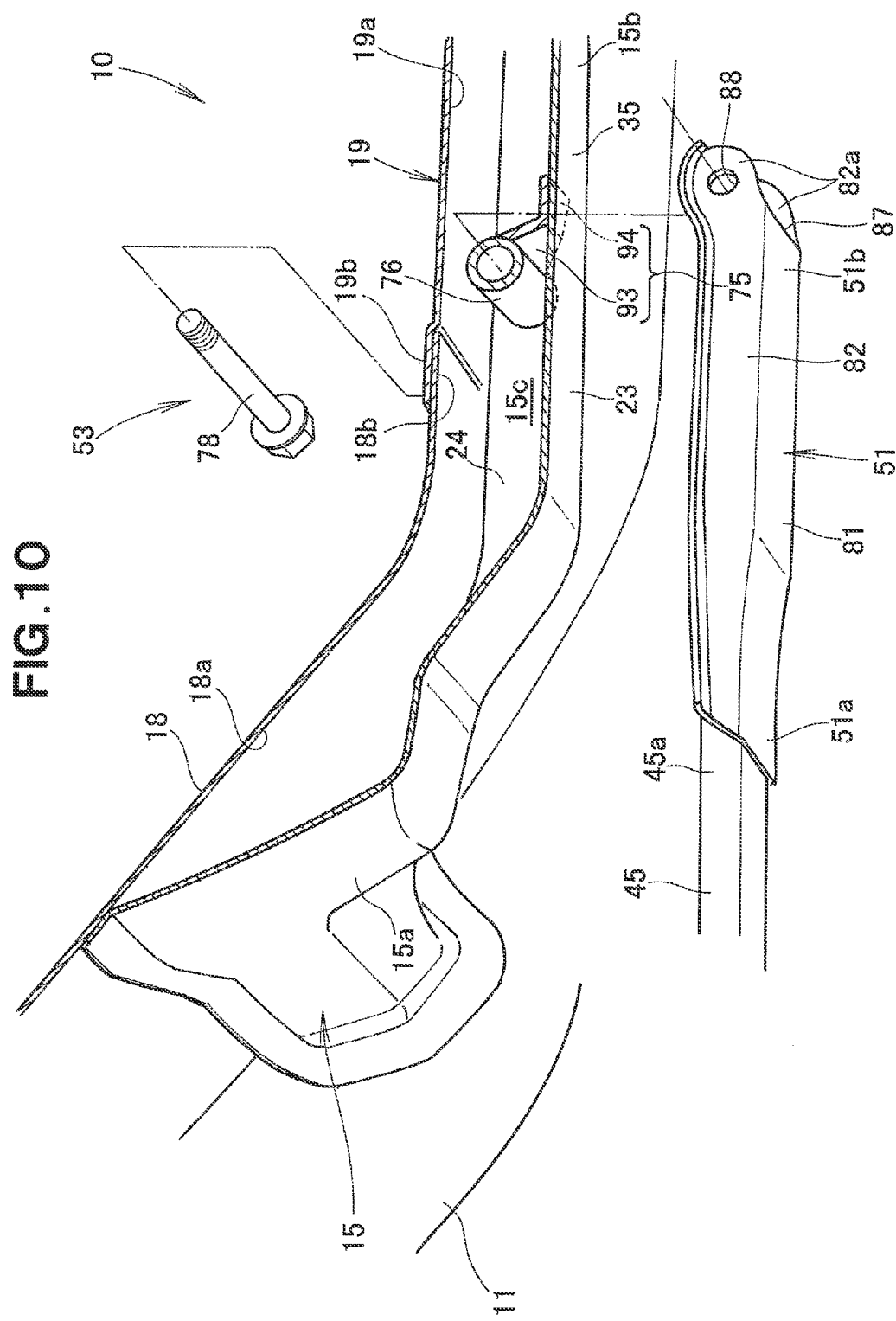
FIG. 10 is a partly broken-away exploded view showing principal elements in a connection of the left sub-frame one end section to the left floor frame shown in FIG. 4.

Further, as shown in FIGS. 3, 6 and 10, distal end regions 51b of the left and right sub-frame one end sections 51 are connected to the support portions 35 of the left and right floor frames 15 via left and right pivot mechanisms 53 in such a manner that they can pivot in a vertical or up-down direction of the vehicle body. The following describe in detail the left pivot mechanism 53. Note that the right swing mechanism 53 is of the same construction as the left pivot mechanism 53 and thus will not be described here to avoid unnecessary duplication.

The left pivot mechanism 53 includes a left bulkhead 75, a left collar section 76 and a left connection member 78 (left bolt 78). The left bulkhead 75 projecting upward from the floor frame bottom section 23 and the left collar section 76 provided on the left bulkhead 75 are located in an interior portion 15c (inner space 15c) of the U cross-sectional shape of the left floor frame 15.

Further, as shown in FIGS. 3 and 9, the left bulkhead 75 is a member press-formed in a substantially L shape. More specifically, the left bulkhead 75 includes a horizontal support section 94 joined to the floor frame bottom section 23, and a vertical collar support wall section 93 extending from the support section 94. Namely, the left bulkhead 75 is joined at its lower end (support section 94) to the floor frame bottom section 23. The collar support wall section 93 projects upward to substantially partition the inner space 15c of the left floor frame 15 in the front-rear direction. As can be readily appreciated by a skilled artisan from the below discussions when read in conjunction with the related figures, the collar may be supported without the use of the bulkhead 75.

Further, as shown in FIGS. 5 and 9, the left collar section 76 is a hollow member that extends in the vehicle width direction in coaxial alignment with the pair of through-holes 36 and joined to the upper end of the left bulkhead 75, i.e. to an upper end portion 93a of the collar support wall section 93. Thus, the left collar section 76 is located near the front end portion 15a of the left floor frame 15. End surfaces 76a, in the vehicle width direction, of the left collar section 76 are held in substantial contact with the inner surfaces of the pair of floor frame side wall sections 24 of the left floor frame 15. In this way, the left collar section 76 can support the floor frame side wall sections 24 in such a manner that the floor frame side wall sections 24 do not fall toward each other.

The upper end portion 93a of the collar support wall section 93 has a width W1 slightly smaller than a distance W2 between the inner surfaces of the pair of floor frame side wall sections 24. The collar support wall section 93 is formed in a substantially reverse trapezoidal shape with its upper end portion 93a greater in width than its lower end. The left floor frame 15 may be of a sectional shape matching that of the collar support wall section 93. For example, the distance W2 between the inner surfaces of the pair of floor frame side wall sections 24 may be chosen to become gradually small in a direction toward the floor frame bottom section 23. The sub-frame one end section 51 fitted over the floor frame 15 may have a sectional shape matching that of the left floor frame 15. Thus, the instant embodiment can enhance a degree of freedom in setting the sectional shapes of the left floor frame 15 and sub-frame one end section 51, thereby enhancing a design freedom of the vehicle body 10.

The left bolt 78 (connection member 78) is a member that is passed through the pair of through-holes 36, left collar section 76 and pair of through-holes 88 to connect the distal end region 51b of the left sub-frame one end section 51 to the left floor frame 15 for pivotal movement in the vertical or up-down direction of the vehicle body.

More specifically, with the pair of sub frame side wall sections 82 fitted over the pair of floor frame side wall sections 24, the pair of through-holes 36, the left collar section 76 and the pair of through-holes 88 are located in collinear alignment with one another. A nut 79 is threaded onto the left bolt 78 after the bolt 78 is passed through the pair of through-holes 36, left collar section 76 and pair of through-holes 88. Thus, the pair of sub frame side wall sections 82 of the sub-frame one end section 51 are connected to the support portion 35 of the pair of side wall sections 24 of the left floor frame 15 in such a manner that they can pivot in the up-down direction of the vehicle body.

Figure 11:
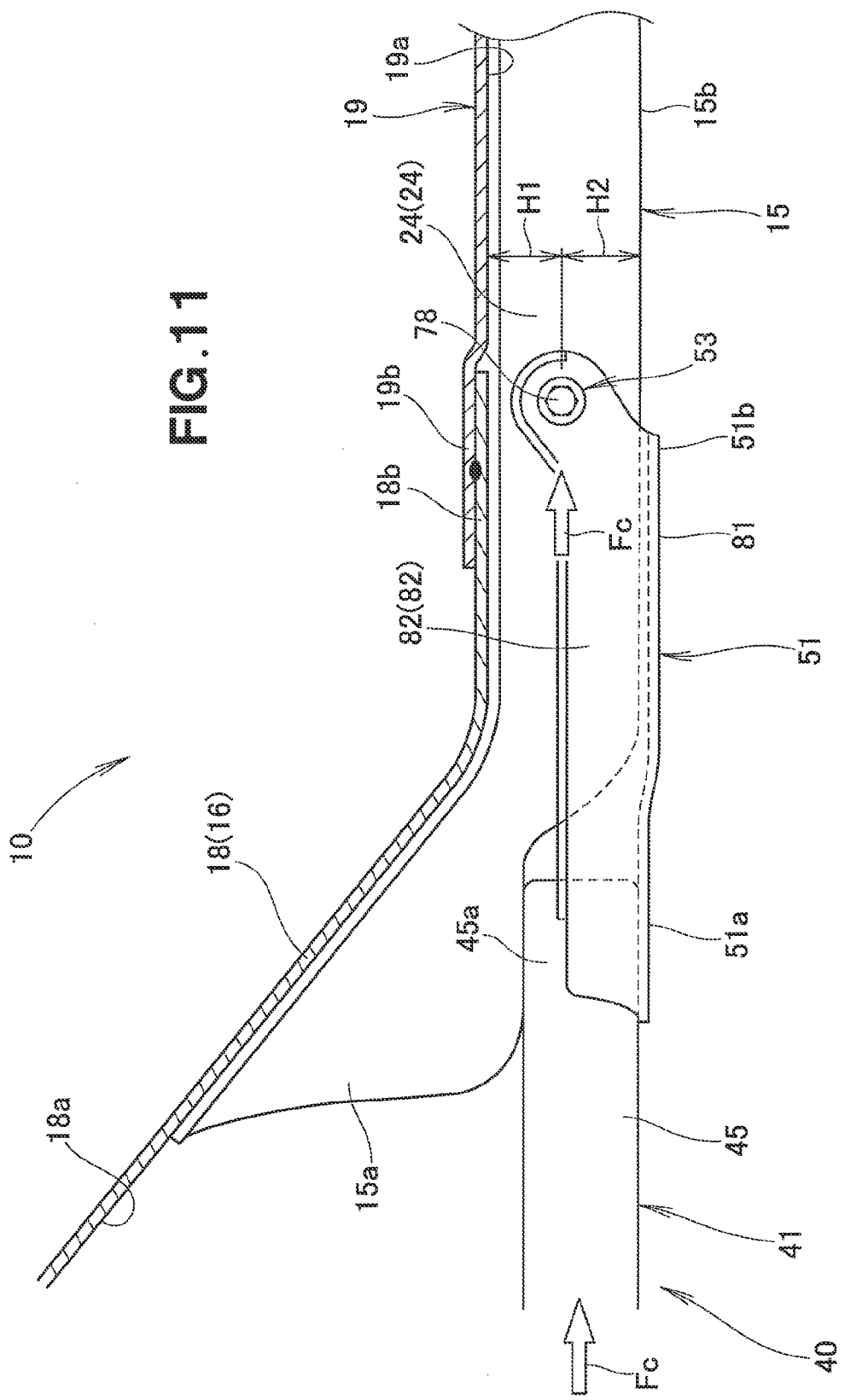
FIG. 11 is a view showing in enlarged scale a section encircled at 11 in FIG. 2.

Further, as shown in FIG. 9, the pair of through-holes 36 are located at a substantially middle position, in the vertical direction, of the pair of floor frame side wall sections 24. More specifically, a height H1 from each of the pair of through-holes 36 to the upper end of the pair of floor frame side wall sections 24 is substantially equal to a height H2 from the each of the through-holes 36 to the floor frame bottom section 23. When a collision force Fc has been input to the vehicle body structure from the front of the vehicle body, it transmits from the bolt 78 to the floor frame bottom section 23 via the collar section 76, but also transmits from the bolt 78 to substantially middle portions, in the vertical direction, of the pair of side wall sections 24 as shown in FIG. 11. Thus, the collision force Fc can be efficiently received by the left floor frame 15.

Further, in the left and right sub frame bottom sections 81, as shown in FIGS. 6 and 7, distal end portions 81a opposed to the one end portions 15a (front end portions 15a) of the left and right floor frames 15 are recessed toward the proximal end sections 51a. Namely, recessed portions 87 are formed in the distal end portions 81a of the left and right sub frame bottom sections 81.

Thus, as the sub frame 41 pivots downward about the left and right bolts 78, the left and right sub frame bottom sections 81 would not hit the one end portions 15a of the left and right floor frames 15. Thus, a collision force Fc input to the sub frame 41 can be effectively absorbed by the sub frame 41 pivoting greatly.

Further, as shown in FIGS. 2 and 6, the sub frame body 42 has a greater rigidity than the left and right front stays 48 and the left and right sub-frame one end sections 51. For example, the left and right front mounting sections 44 and the left and right rear mounting sections 45 of the sub frame body 42 have a high rigidity by being reinforced with ribs extending in the front-rear direction of the vehicle body.

More specifically, the left and right front stays 48 are constructed to be more fragile than the left and right front mounting sections 44 of the sub frame body 42. Thus, a front part 58 of the left front stay 48 is particularly fragile relative to a part of the left front stay 48 connected to the front end portion 44a of the left front mounting section 44. Thus, the front part 58 of the left front stay 48 will hereinafter be referred to as "front fragile part 58" (bend-permitting part 58). Similarly, the front part 58 of the right front stay 48 will hereinafter be referred to as "front fragile part 58" (bend-permitting part 58).

Further, the left and right sub-frame one end sections 51 are constructed to be more fragile than the left and right rear mounting sections 45 of the sub frame body 42. Thus, a rear part 85 of the left sub-frame one end section 51 is particularly fragile relative to a part of the left sub-frame one end section 51 integrated with the rear end portion 45a of the left rear mounting section 45. Thus, the rear part 85 of the left sub-frame one end section 51 will hereinafter be referred to as "rear fragile part 85" (bend-permitting part 85). Similarly, the rear part 85 of the right sub-frame one end section 51 will hereinafter be referred to as "rear fragile part 85" (bend-permitting part 85).

A material, sectional shape, thickness, presence/absence of a bead, presence/absence of a recess, etc. of the front fragile parts 58 are chosen such that the front fragile parts 58 are more fragile than the left and right front mounting sections 44. Similarly, a material, sectional shape, thickness, presence/absence of a bead, presence/absence of a recess, etc. of the rear fragile parts 85 are chosen such that the rear fragile parts 85 are more fragile than the left and right rear mounting sections 45.

Namely, the left front and rear fragile parts 58 and 85 and the right front and rear fragile parts 58 and 85 that are bendable in the downward direction of the vehicle body in response to a collision force Fc input from the front of the vehicle body toward the rear of the vehicle body are provided on front and rear portions of the sub frame 41. The mount section 43 is located between the left front and rear fragile parts 58 and 85 and between the right front and rear fragile parts 58 and 85.

Further, as shown in FIGS. 4, 6, 10 and 11, the slanting plate 18 of the lower dashboard panel 16 is joined at its lower end portion to the front end portion 19b of the floor panel 19. Thus, rigidity at and around a corner portion between the slanting plate 18 and the substantially horizontal floor panel 19 is great. The left and right floor frames 15 extend from the front end portions 15a, joined to the slanting plate 18, toward the rear of the vehicle body along the lower surface 19a of the floor panel 19. The left and right collar sections 76 are located near the front end portions 15a of the left and right floor frames 15. Namely, the left and right collar sections 76 are located in the neighborhood of the high-rigidity corner portion.

Thus, the left and right sub-frame one end sections 51 are vertically pivotably connected to regions of the left and right floor frames 15 near the front end portions 15a, i.e. near the high-rigidity corner portion. Thus, of the left and right floor frames 15, the regions having the left and right sub-frame one end sections 51 vertically pivotably connected thereto have a great rigidity. Because the left and right sub-frame one end sections 51 can be supported sufficiently by the high-rigidity regions of the left and right floor frames 15, the instant embodiment can enhance operating stability of the vehicle, i.e. traveling stability of the vehicle.

Figure 12:
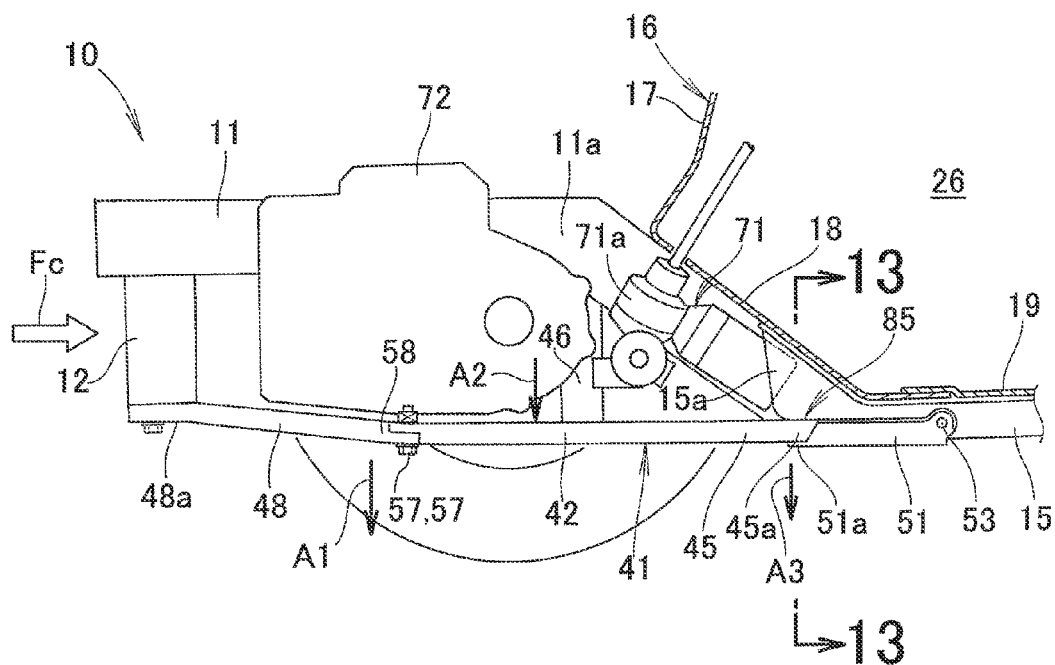
FIG. 12 is a view explanatory of a case where a collision force has acted from the front of the vehicle on the front section of the vehicle body shown in FIG. 2.
Figure 14:
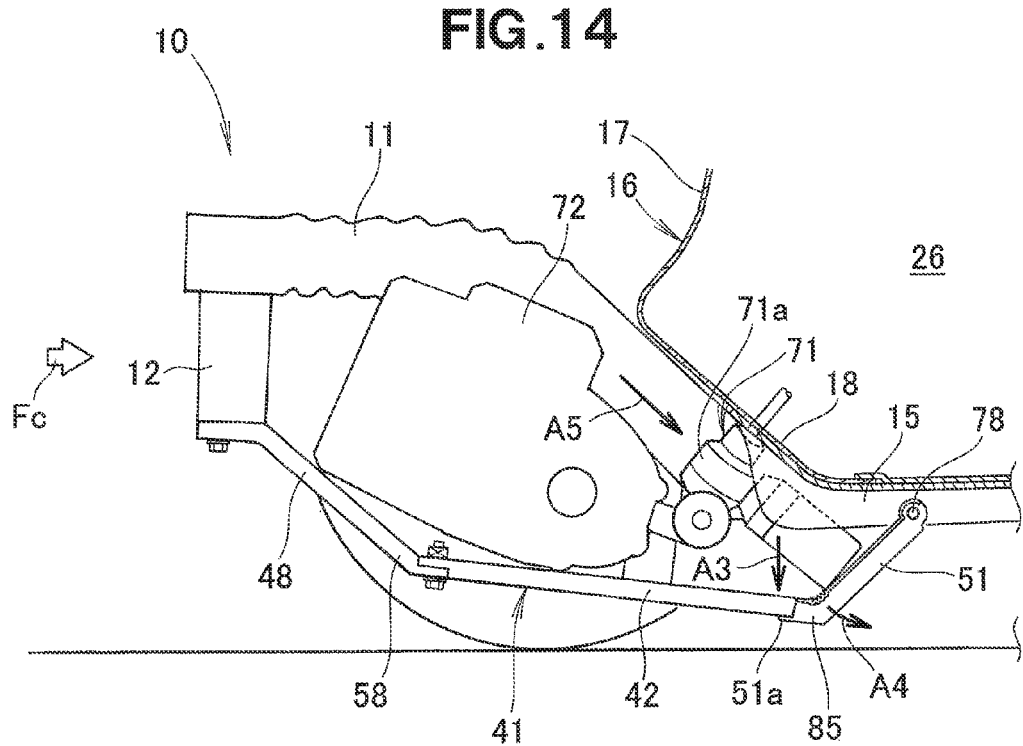
FIG. 14 is a view explanatory of an example manner in which the vehicle body absorbs a collision force having acted on the front section of the vehicle body shown in FIG. 12.

The following paragraphs describe, with reference to FIGS. 12 and 14, how, at the time of occurrence of a so-called frontal collision where a collision force acts on the front surface of the vehicle, the vehicle body structure behaves to absorb the collision force Fc from the front. Note that behavior of only the left-side components of the vehicle body structure will be described below to ease understanding the collision-force absorbing behavior of the vehicle body structure.

As shown in FIG. 12, the collision force Fc from the front transmits via the bulkhead 12 to the front end portion 48a of the left side frame 41. By the collision force Fc, the left front fragile part 58 bends downward as indicated by arrow A1. Thus, downward pulling force acts on the left side mounting section 46 as indicated by arrow A2. Consequently, the left side mounting section 46 fractures or breaks and is detached from and drops off the rear end portion 11a of the left side frame 11 as indicated by arrow A2. As a consequence, the left front fragile part 58 bends further downward as indicated by arrow A1. In this way, downward pulling force acts on a rear end portion 45a of the left rear mounting section 45 of the sub frame 41 as indicated by arrow A3.

Figure 13:
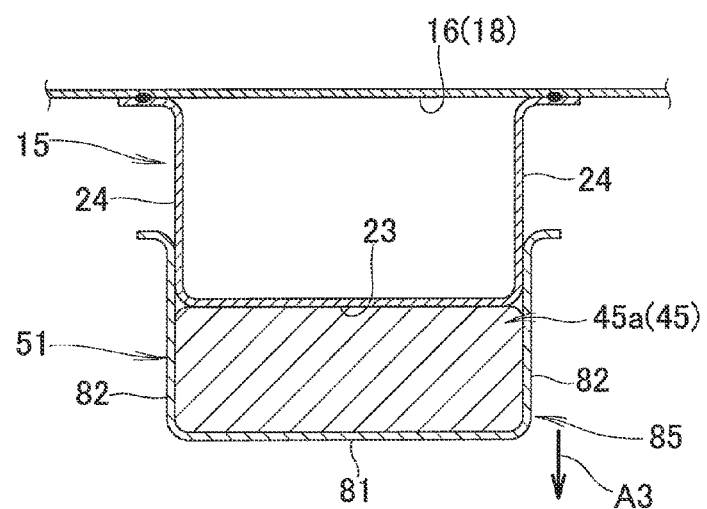
FIG. 13 is a sectional view taken along line 13-13 of FIG. 12.

Thus, as shown in FIGS. 12 and 13, the downward pulling force acting as indicated by arrow A3 becomes greater than the frictional force (sandwiching force) between the pair of sub frame side wall sections 82 and the pair of floor frame side wall sections 24, so that the pair of sub frame side wall sections 82 are detached from the pair of floor frame side wall sections 24. Consequently, downward pulling force acts directly on the left rear fragile part 85 as indicated by arrow A3.

Further, as shown in FIG. 14, the downward pulling force causes the rear fragile part 85 to bend downward. The left sub-frame one end section and rear fragile part 85 greatly pivot downward about the left connection member 78 as indicated by arrow A4. Thus, the sub frame body 42 greatly moves back while greatly inclining rearwardly and downwardly. As the sub frame body 42 greatly moves rearwardly and downwardly like this, the electric power steering gearbox 71a and the power unit 72 greatly move back along the slanting plate 18 of the lower dashboard panel 16 while greatly inclining rearwardly and downwardly.

Namely, as shown in FIGS. 2 and 4, the left and right sub-frame one end sections 51 are greatly pivotable in the downward direction of the vehicle body about the connection members 78, extending in the vehicle width direction, in response to the collision force Fc transmitting to the sub frame 41; that is, in response to the collision force Fc transmitting to the sub frame 41, the left and right sub-frame one end sections 51 pivot downwardly below the left and right floor frames 15. Thus, buckling action of the left and right side frames 11 responsive to the collision force Fc would not be hampered by the sub frame 41. In addition, the instant embodiment can secure a sufficient buckling range where the left and right side frames 11 can buckle in response to the collision force Fc. By buckling in an appropriate manner like this, the left and right side frames 11 can sufficiently absorb the collision force Fc. Further, because the sub frame 41 is greatly pivotable in the downward direction of the vehicle body about the corresponding connection members 78, the sub frame 41 would not collide against the lower dashboard panel 16. In this way, the instant embodiment can prevent the collision force Fc from transmitting from the sub frame 41 to the lower dashboard panel 16.

In other words, as the left and right side frames 11 buckle in response to the collision force Fc, not only the front fragile parts 58 and the rear fragile parts 85 bend downward, but also the left and right sub-frame one end sections 51 pivot downward about the connection members 78. As a consequence, the electric power steering gearbox 71a is guided rearwardly and downwardly of the vehicle body 10. Namely, because the gearbox 71a moves, or is displaced, rearwardly and downwardly generally along the slanting plate 18 of the lower dashboard panel 16, it can greatly move without hitting the slanting plate 18. Thus, the sub frame 41 and left and right side frame 11 having received the collision force Fc can greatly deform to thereby greatly absorb the collision force Fc. Besides, because the electric power steering gearbox 71a is guided rearwardly and downwardly of the vehicle body 10, the instant embodiment can even more reliably prevent the collision force Fc from being input via the sub frame 41 to the lower dashboard panel 16.

Further, as shown in FIGS. 2, 9 and 12, the left and right bulkheads 75 are joined at their upper end to the left and right collar sections 76 and at their lower end to the floor frame bottom sections 23 of the left and right floor frames 15. The left and right floor frames 15 have a high rigidity by the floor frame bottom sections 23 being reinforced with the left and right bulkheads 75. The high-rigidity left and right floor frames 15 can sufficiently pivotably support the left and right sub-frame one end sections 51 by means of the left and right connection members 78 passed through the left and right collar sections 76.

Thus, the sub frame 41 can pivot in the downward direction of the vehicle body in response to the collision force Fc with an even higher reliability. Therefore, the instant embodiment can secure a sufficient buckling range where the left and right side frames 11 can buckle in response to the collision force Fc. The left and right side frames 11 can sufficiently absorb the collision force Fc by sufficiently buckling in response to the collision force Fc.

Embodiment 2

Figure 15:
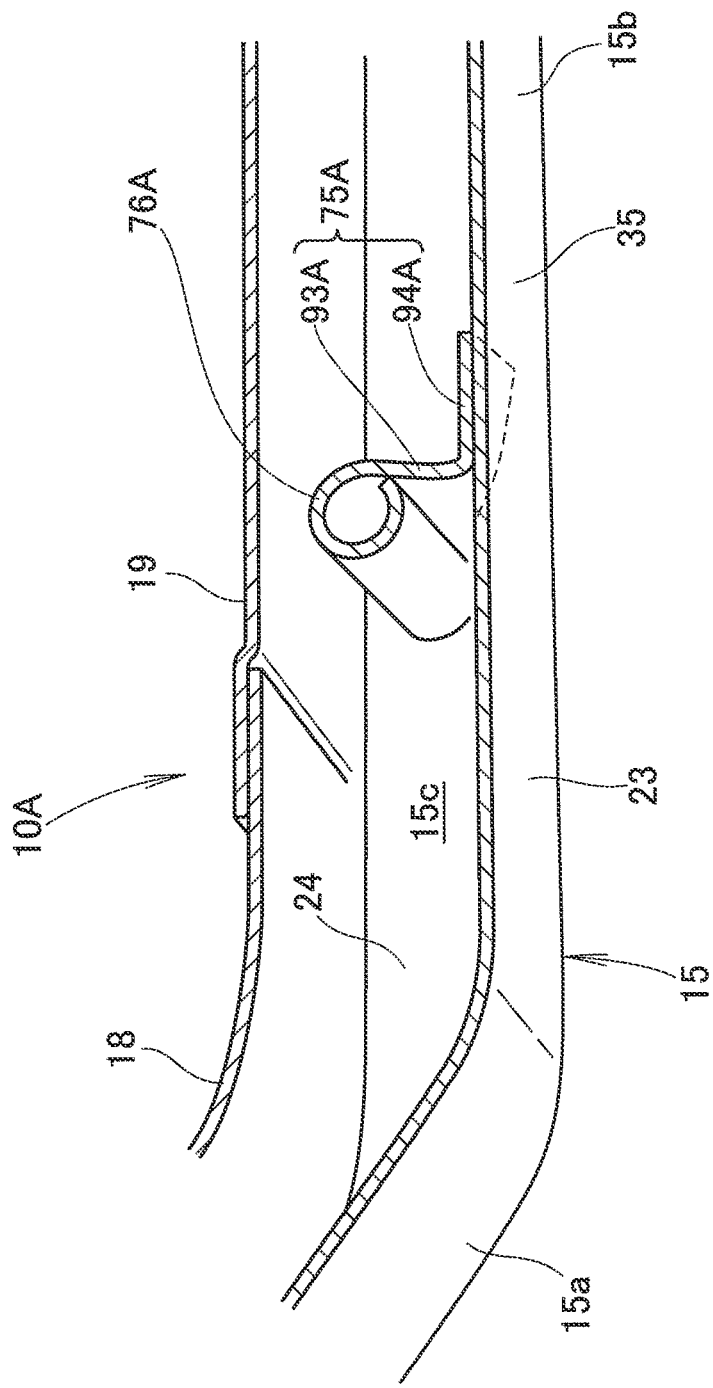
FIG. 15 is a partly broken-away exploded view showing relationship of a bulkhead and a collar section to the left floor frame of the vehicle body in a second embodiment of the present invention.

The following describe, with reference to FIG. 15, a second embodiment of the vehicle body structure of the present invention. The vehicle body structure 10A in the second embodiment of the vehicle body structure is characterized by including a modified left bulkhead 75A and a modified left collar section 76A shown in FIG. 15 in place of the left bulkhead 75 and the left collar section 76 of FIG. 10 employed in the first embodiment. The other components of the vehicle body 10A in the second embodiment are substantially identical in construction to the corresponding components of the vehicle body 10 in the first embodiment and represented by the same reference numerals as the corresponding components of the first embodiment, and these other components of the vehicle body in the second embodiment will not be described here to avoid unnecessary duplication. Although not particularly shown and described, the right bulkhead and the right collar section are of the same construction as the left bulkhead 75A and the left collar section 76A.

As shown in FIG. 15, the left bulkhead 75A and the left collar section 76A in the second embodiment are each a component part formed by bending a steel plate, or an integrally cast or forged component part. The left bulkhead 75A includes a horizontal support section 94A, and a vertical collar support wall section 93A.

In the above-described first embodiment, the bulkhead 75 and the collar section 76 are separated members joined to each other as shown in FIG. 10. In the second embodiment, however, the bulkhead 75A and the collar section 76A are integrally formed of a single material, and thus, the number of necessary component parts can be advantageously reduced.

Embodiment 3

Figure 16:
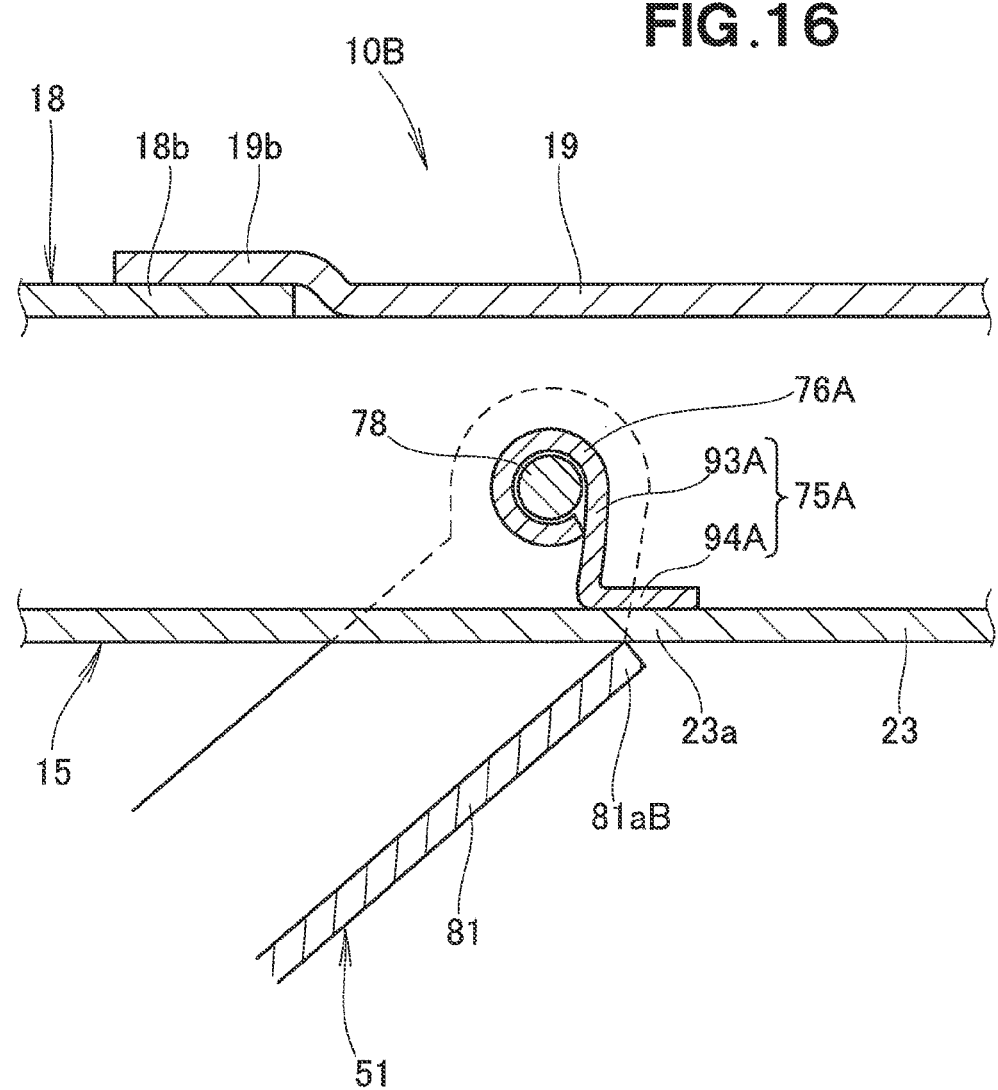
FIG. 16 is a partly broken-away view showing principal elements in a connection of the left sub-frame one end section to the left floor frame in a third embodiment of the present invention.

The following describe, with reference to FIG. 16, a third embodiment of the vehicle body structure of the present invention. The vehicle body 10B in the third embodiment the vehicle body structure is characterized in that the bottom section 81 of the left sub-frame one end section 51b has a modified distal end portion 81aB shown in FIG. 16 in place of the distal end portion 81a of FIG. 10 employed in the first embodiment. The other components of the vehicle body 10B in the third embodiment are substantially identical in construction to the corresponding components of the vehicle body 10 in the first embodiment and represented by the same reference numerals as the corresponding components of the vehicle body 10 in the first embodiment, and these other components of the vehicle body 10B in the third embodiment will not be described here to avoid unnecessary duplication. Although not particularly shown and described, the distal end region of the right sub frame bottom section is of the same construction as the distal end region of the left sub frame bottom section 81.

As shown in FIG. 16, the bulkhead 75A and the collar section 76A employed in the third embodiment are of the same construction as in the second embodiment shown in FIG. 15. Alternatively, the bulkhead 75 and the collar section 76 provided in the first embodiment may be employed in the third embodiment.

In the third embodiment, the distal end portion 81aB of the left sub frame bottom section 81 does not have the recessed portion 87 (see FIG. 7) formed therein. Thus, as the sub frame 41 pivots downward about the connection member 78, the distal end portion 81aB would hit the sub frame bottom section 23.

In the third embodiment, however, the support section 94A of the bulkhead 75A is provided on and joined to a portion of the floor frame bottom section 23 that is hit by the distal end portion 81aB. Thus, in the third embodiment, the portion of the floor frame bottom section 23 that would be hit by the distal end portion 81aB is reinforced with the bulkhead 75A. In this manner, the floor frame bottom section 23 can sufficiently bear a hitting impact when the distal end portion 81aB has hit that portion.

Namely, even when the sub-frame one end section 51 has hit the left floor frame 15 during downward pivoting movement of the sub frame 41, deformation of the left floor frame 15 can be suppressed because the left floor frame 15 has a high rigidity. Thus, the instant embodiment can suppress an input collision force Fc from transmitting from the sub frame 41 to the lower dashboard panel 16 via the left floor frame 15.

Embodiment 4

Figure 17:
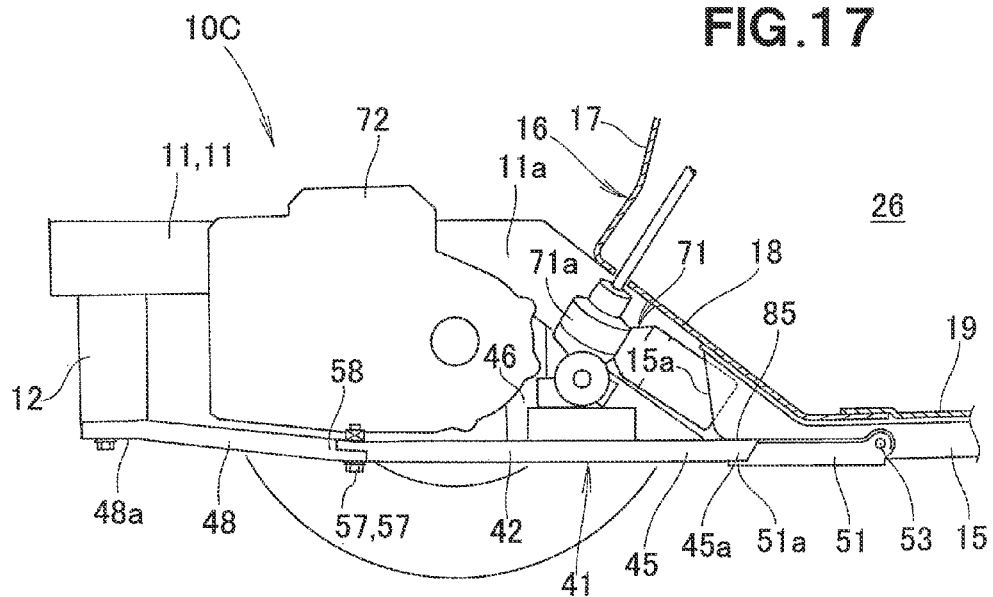
FIG. 17 is a left side sectional view of the front section of the vehicle body in a fourth embodiment of the present invention.
Figure 18:
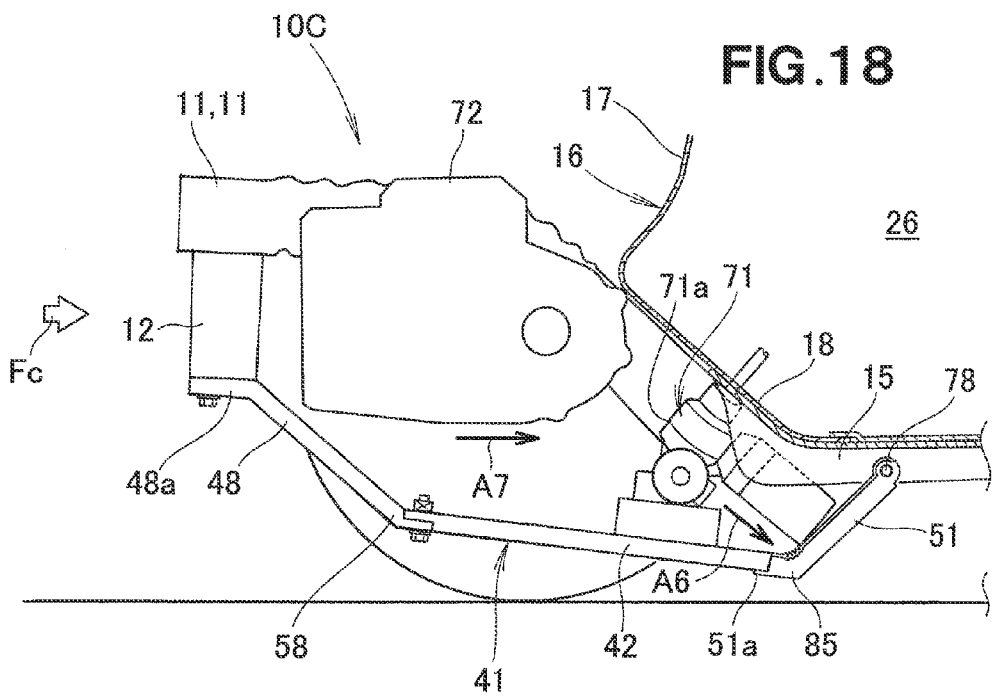
FIG. 18 is a view explanatory of an example manner in which the vehicle body structure absorbs a collision force having acted on the front section of the vehicle body shown in FIG. 17.
Figure 19:
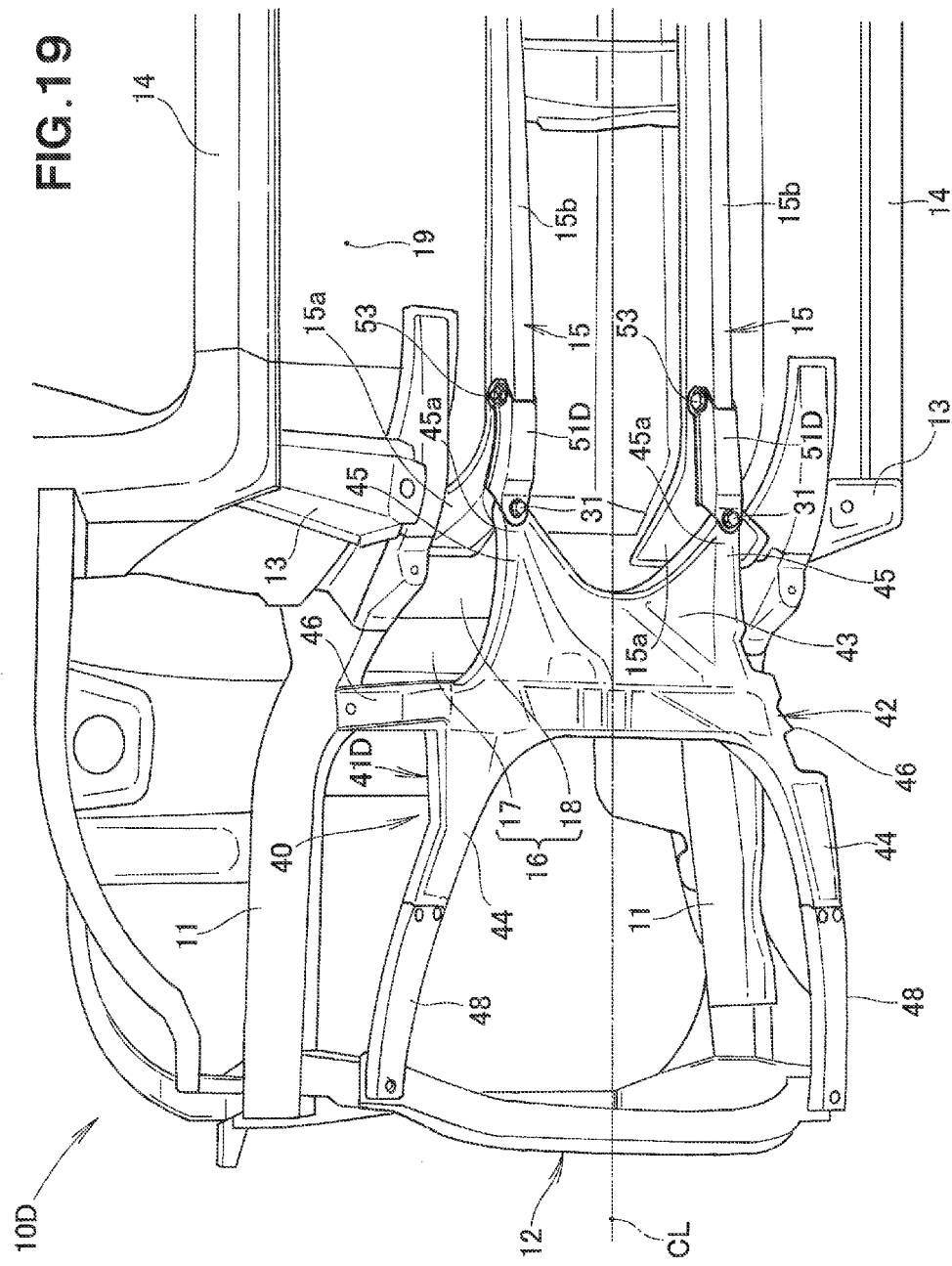
FIG. 19 is a bottom perspective view showing the front section of the vehicle body in a fifth embodiment of the present invention.

The following describe, with reference to FIGS. 17 and 18, a fourth embodiment of the vehicle body structure of the present invention. The vehicle body 10C in the fourth embodiment is substantially of the same construction as the vehicle body 10 in the first embodiment, except that the mount section of the power unit 72 in the first embodiment shown in FIG. 2 is modified. The other components of the vehicle body 10C in the fourth embodiment are substantially identical in construction to the corresponding components of the vehicle body 10 in the first embodiment and represented by the same reference numerals as the corresponding components of the vehicle body 10 in the first embodiment, and these components of the vehicle body 10C in the fourth embodiment will not be described here to avoid unnecessary duplication.

The fourth embodiment is characterized in that the power unit 72 is mounted on the left and right side frames 11 as shown in FIG. 17. As shown in FIG. 18, when a collision force Fc has been input to the left and right side frames 11, it transmits to the front end portion 48a of the sub frame 41. In the same manner as in the first embodiment shown in FIG. 14, the sub frame 41 moves rearwardly and downwardly. In response to such movement or displacement, the electric power steering gearbox 71a moves rearwardly and downwardly of the vehicle body 10C as indicated by arrow A6. Thus, the gearbox 71a does not prevent the power unit 72 from moving horizontally rearward as indicated by arrow A7. By the power unit 72 greatly moving rearward as indicated by arrow A7 like this, the left and right side frames 11 can sufficiently absorb the collision force Fc input from the front of the vehicle body.

Embodiment 5

The following describe, with reference to FIGS. 19 to 31, a fifth embodiment of the vehicle body structure of the present invention. The vehicle body 10D in the fifth embodiment of the vehicle body structure is characterized by including modified left and right sub-frame one end sections 51D of a sub frame 41D shown in FIGS. 21 to 26 in place of the left and right sub-frame one end sections 51 of the sub frame 41 in the first embodiment shown in FIGS. 5 and 6. The other components of the vehicle body 10D in the fifth embodiment of the vehicle body structure are substantially identical in construction to the corresponding components of the vehicle body 10 in the first embodiment of the vehicle body structure and represented by the same reference numerals as the corresponding components of the vehicle body 10 in the first embodiment, and these components of the fifth embodiment will not be described here to avoid unnecessary duplication.

In the above-described first embodiment, as shown in FIGS. 5 to 7, the front end portions 51a (proximal end portions 51a) of the left and right sub-frame front end sections 51 are formed integrally on the sub frame 41.

In the fifth embodiment, on the other hand, the left and right sub-frame one end sections 51D are in the form of left and right separated members that are separated from the sub frame 41D in the front-rear direction of the vehicle body 10D. The sub frame 41D in the fifth embodiment is substantially of the same construction as the sub frame 41 in the first embodiment, except that it has the left and right separated sub-frame one end sections 51D. The left and right sub-frame one end sections 51D will hereinafter be sometimes referred to as "left and right separated members 51D".

In each of the left and right separated members 51D, as shown in FIGS. 21 to 24, through-holes 83 are formed in the respective sub frame bottom sections 81 of the left and right end portions 51a (front end portions 51a). The left and right end portions 51a are fastened to the sub frame 41D by means of the fastener members 31 passed through the left and right through-holes 83. The fasteners 31 are, for example, in the form of bolts.

The left and right through-holes 83 are sized, or set to a size, such that they are movable or displaceable relative to the left and right fastener members 31 (bolts 31) at least in the vehicle width direction. For example, the left and right through-holes 83 are elongated in the vehicle width direction.

Figure 21:
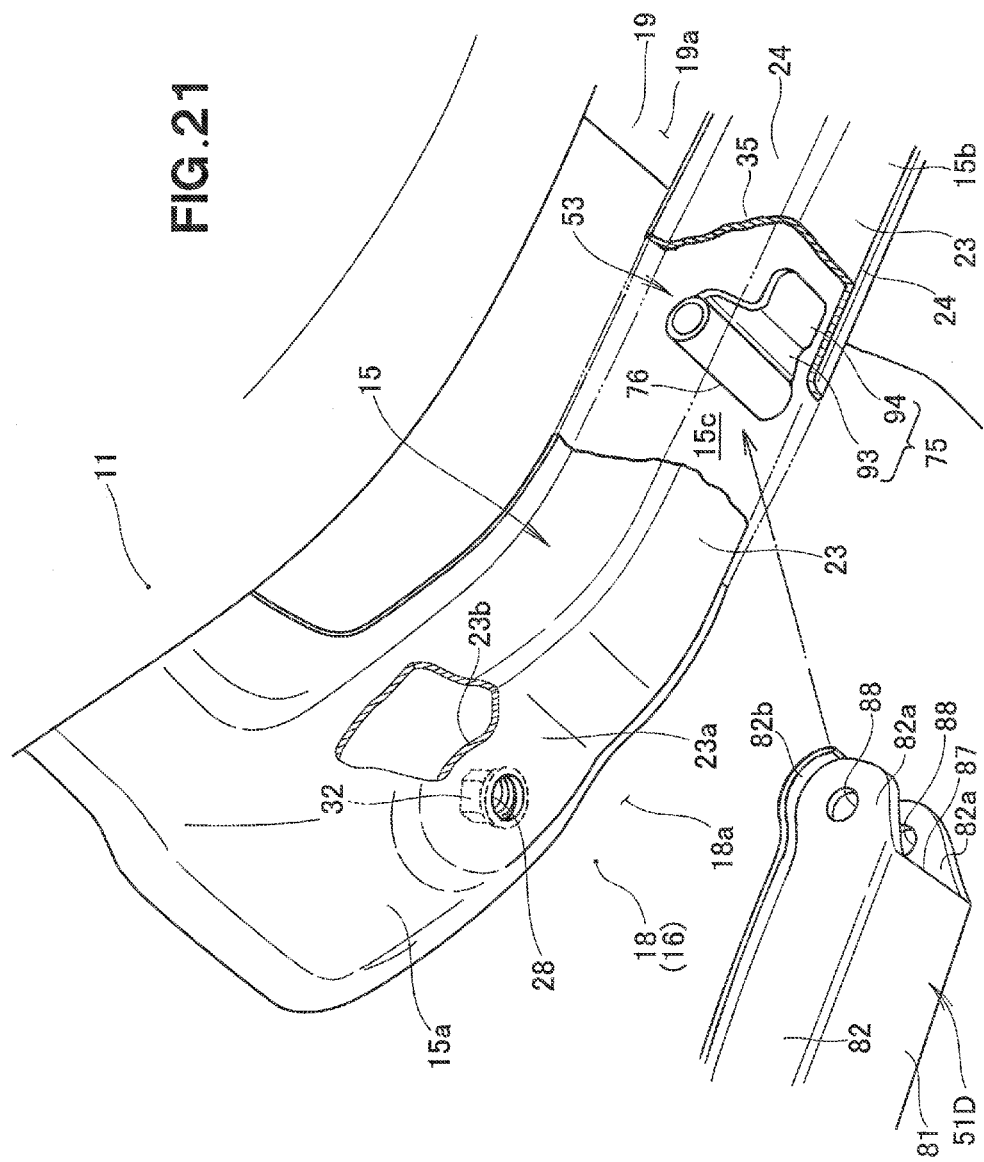
FIG. 21 is an exploded view showing the relationship between the left floor frame and the left sub-frame one end section shown in FIG. 20.
Figure 22:
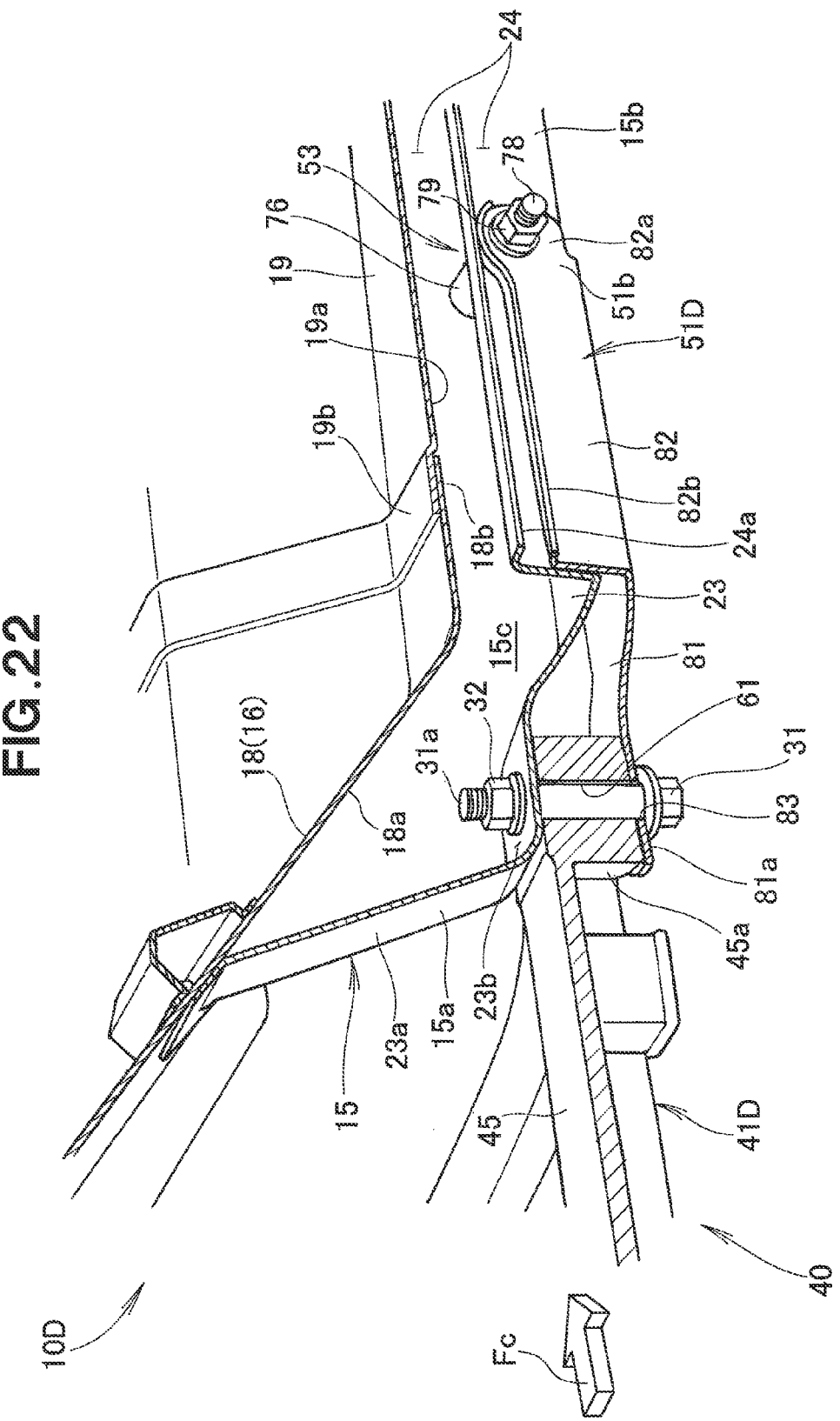
FIG. 22 is a partly broken-away view showing the relationship between the left floor frame and the left sub-frame one end section shown in FIG. 20.
Figure 26:
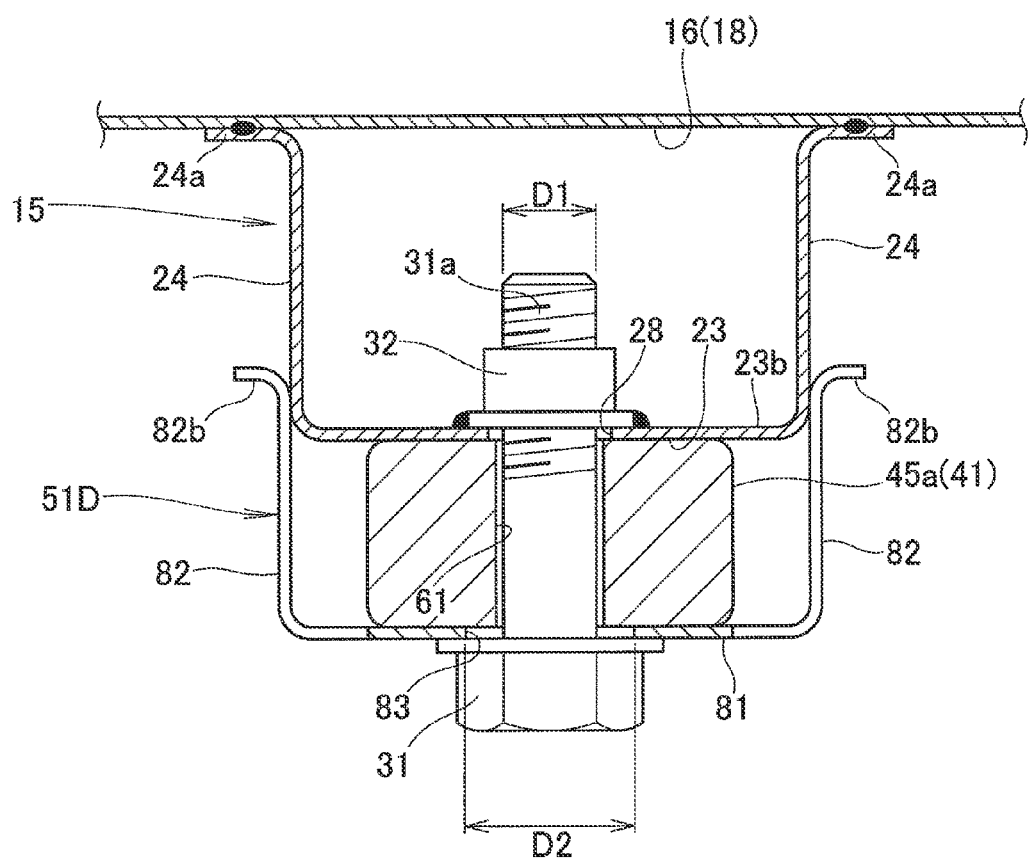
FIG. 26 is a sectional view taken along line 26-26 of FIG. 25.

Further, as shown in FIGS. 21, 22 and 26, a mounting hole 28 is formed in a front end portion 23a of the floor frame bottom section 23. A welding nut 32 is disposed on the inner surface 23b of the floor frame bottom section 23 in alignment with the axial centerline of the mounting hole 28. The welding nut 32 is welded to the inner surface 23b of the floor frame bottom section 23 in such a manner that it can be detached from the inner surface 23b by a predetermined impact force.

Further, as shown in FIGS. 22 to 26, the rear end portion 45a of the left rear mounting section 45 and the distal end portion 81a (one end portion 81a) of the left separated member 51D are superposed on the lower surface of the front end portion 23a of the left floor frame bottom section 23 in the order mentioned and fastened together by means of the bolt 31 and nut 32.

More specifically, the bolt 31 is passed through the mounting hole 28, through-hole 61 and through-hole 83, and a threaded portion 31a of the bolt 31 projecting out of the mounting hole 28 is screwed to the welding nut 32. Consequently, the rear end portion 45a of the left rear mounting section 45 is sandwiched between the floor frame bottom section 23 of the left floor frame 15 and the sub frame bottom section 81 of the left separated member 51D, and fastened to the floor frame bottom section 23 by means of the bolt 31 and the welding nut 32 in such a sandwiched state.

When a collision force Fc has been input via the front end portion 48a of the sub frame 41D (see FIG. 24) toward the rear of the vehicle body in the aforementioned state, the collision force Fc transmits to the welding nut 32 by way of the bolt 31. As a consequence, the welding nut 32 is detached from the floor frame bottom section 23 to push and expand the mounting hole 28 of the floor frame bottom section 23. Then, the welding nut 32 drops through the expanded mounting hole 28 downwardly below the floor frame bottom section 23. Namely, the rear end portion 45a of the left rear mounting section 45 is connected to the one end portion 15a of the left floor frame 15 by means of the bolt 31 and the welding nit 32 in such a manner that the rear end portion 45a can be detached from the one end portion 15a due to the collision force Fc. The rear mounting section 45 is of the same construction of the left rear mounting section 45.

Figure 23:
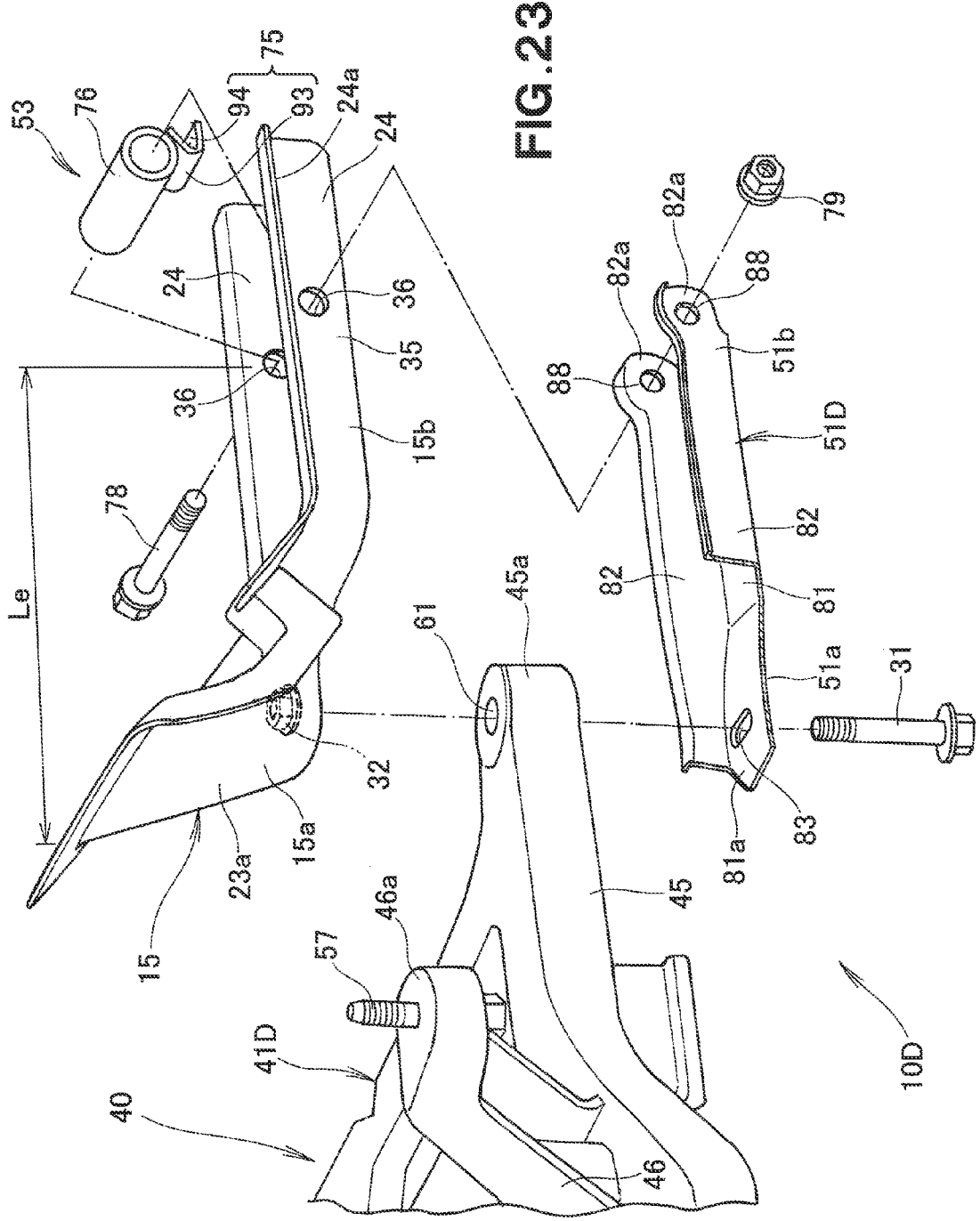
FIG. 23 is an exploded view showing the relationship between the left floor frame and the left sub-frame one end section shown in FIG. 22.
Figure 24:
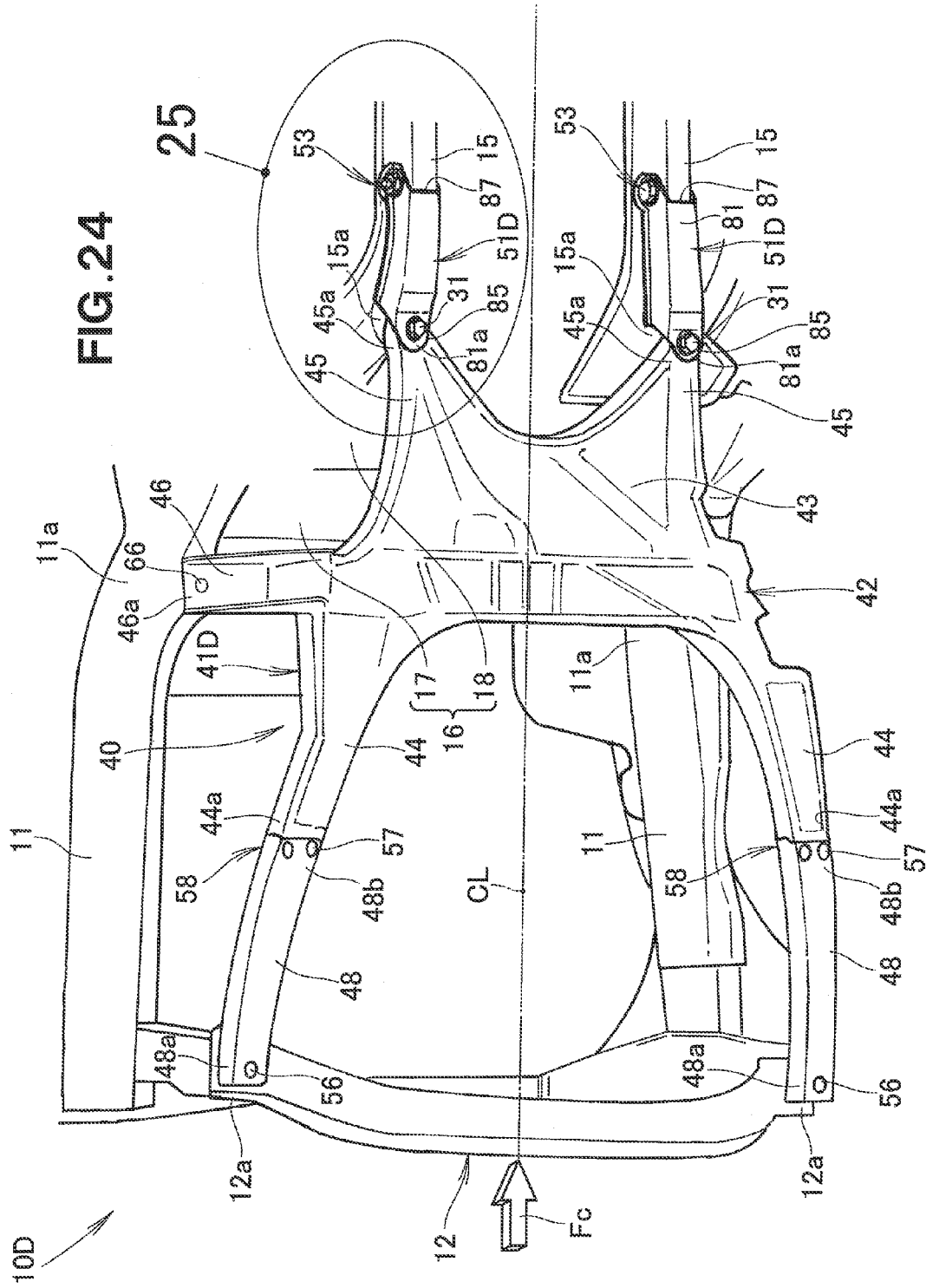
FIG. 24 is a bottom perspective view showing in enlarged scale principal elements in the front section of the vehicle body shown in FIG. 19.
Figure 25:
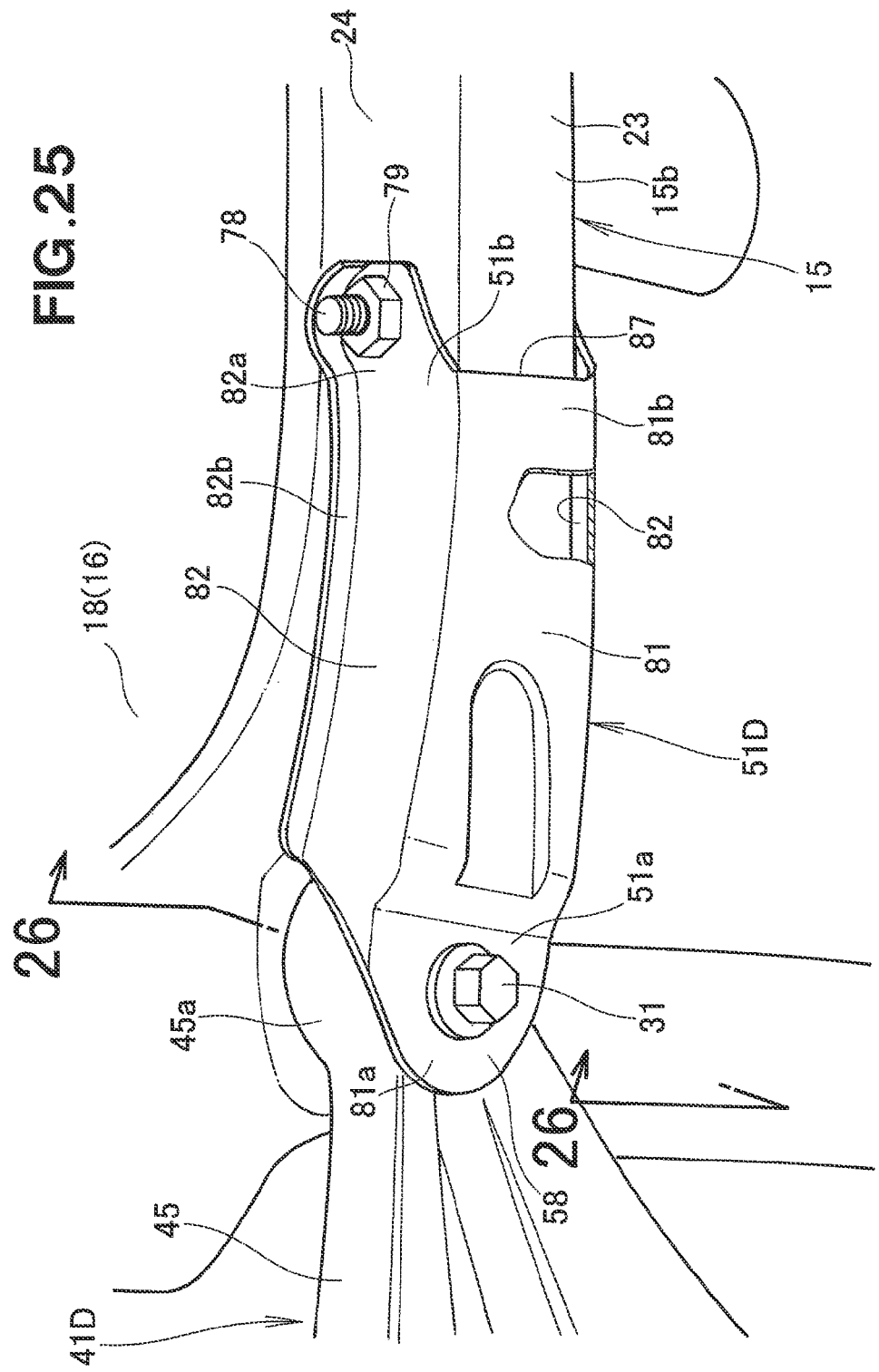
FIG. 25 is a view showing in enlarged scale a section encircled at 25 in FIG. 24.

As shown in FIGS. 23 and 24, the distal end portion 81a (one end portion 81a) of the left separated member 51D is connected to the rear end portion 45a of the left rear mounting section 45 by means of the fastener member 31 (i.e., by means of the bolt 31 and the welding nut 32). The rear part 85 is particularly fragile relative to the part of the left separated member 51D connected to the rear end portion 45a of the left rear mounting section 45. The rear part 85 will hereinafter be referred to as "rear fragile part 85". Similarly, the rear part 85 of the right separated member 51D will hereinafter be referred to as "rear fragile part 85".

Further, as shown in FIGS. 23 and 26, the through-hole 83 is an elongated hole having a length D2 in the vehicle width direction greater than the diameter D1 of the bolt 31. Thus, the bolt 31 passed through the through-hole 83 is movable or displaceable relative to the through-hole 83 in the vehicle width direction before being firmly tightened by the welding nut 32.

The reason why the bolt 31 and the through-hole 83 are displaceable relative to each other in the vehicle width direction is as follows. Namely, the pair of sub frame side wall sections 82 of the left separated member 51D are constructed to be fittable over the pair of floor frame side wall sections 24. However, due to machining tolerance and/or assembling tolerance, it may sometimes be difficult for the pair of sub frame side wall sections 82 to be fitted over the pair of floor frame side wall sections 24.

Thus, the through-hole 83 is formed as an elongated hole displaceable relative to the bolt 31 in the vehicle width direction, so that machining tolerance and assembling tolerance of the left floor frame 15 and the left separated member 51D can be absorbed by the length of the through-hole 83. In this way, the pair of sub frame side wall sections 82 can be readily fitted over the pair of floor frame side wall sections 24.

Figure 29:
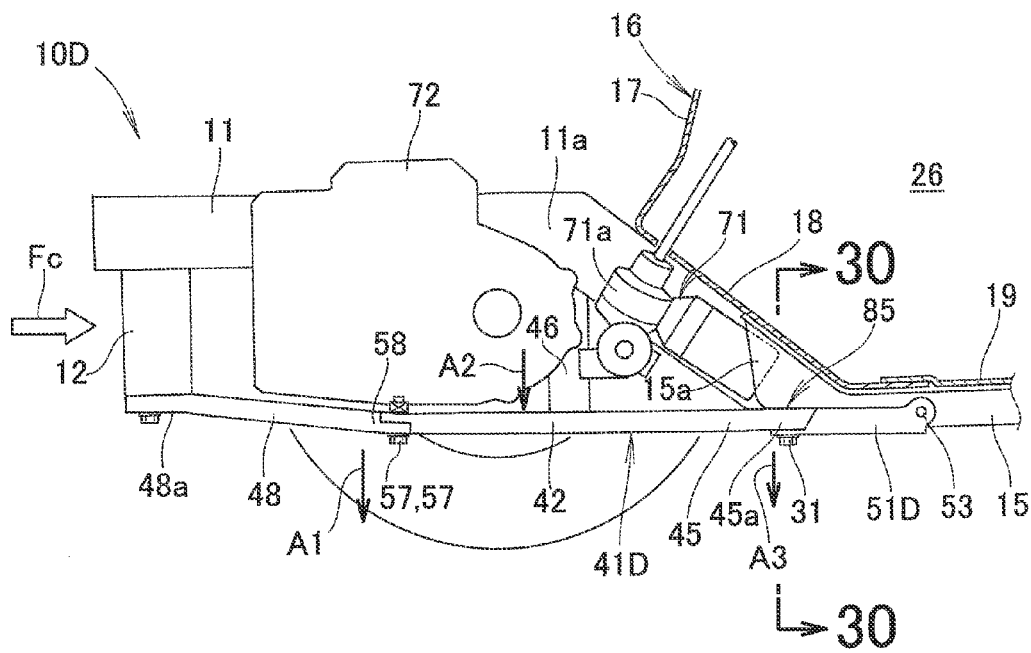
FIG. 29 is a view explanatory of an example where a collision force has acted on the front section of the vehicle body shown in FIG. 20.
Figure 30:
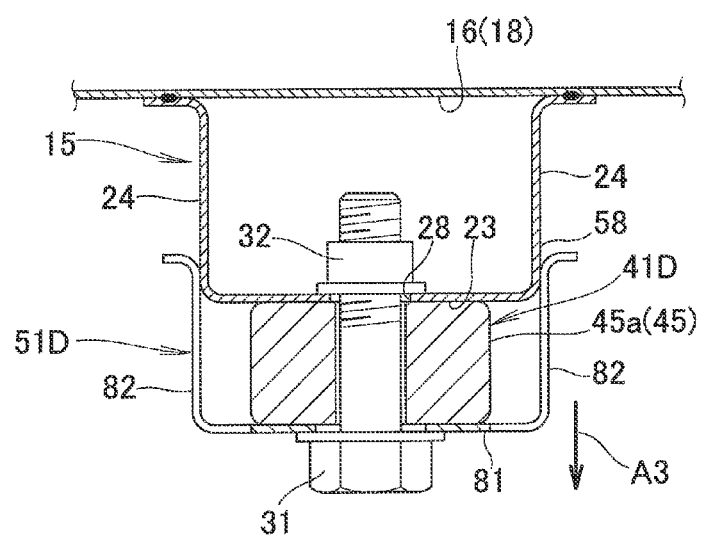
FIG. 30 is a sectional view taken along line 30-30 of FIG. 29.
Figure 31:
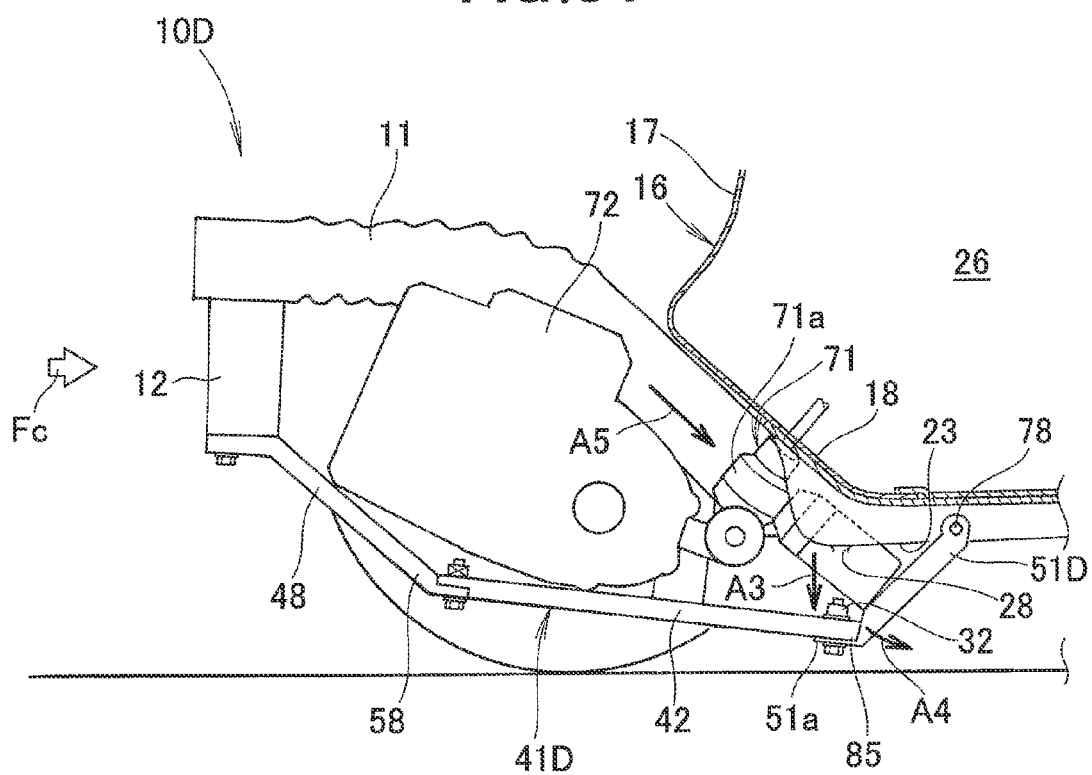
FIG. 31 is a view explanatory of an example manner in which the vehicle body structure absorbs a collision force having acted on the front section of the vehicle body shown in FIG. 29.

The following paragraphs describe, with reference to FIGS. 29 to 31, how, at the time of occurrence of so-called frontal collision where a collision force acts on the front surface of the vehicle, the vehicle body structure behaves to absorb the collision force Fc from the front. Note that behavior of only the left-side components of the vehicle body structure will be described below to ease understanding the collision-force absorbing behavior.

As shown in FIG. 29, the collision force Fc from the front transmits via the bulkhead 12 to the front end portion 48a of the left side frame 41D. By the collision force Fc, the left front fragile part 58 bends downward as indicated by arrow A1. Thus, downward pulling force acts on the left side mounting section 46 as indicated by arrow A2. Consequently, the left side mounting section 46 fractures or breaks and is detached from and drops off the rear end portion 11a of the left side frame 11 as indicated by arrow A2. As a consequence, the left front fragile part 58 bends further downward as indicated by arrow A1. In this way, downward pulling force acts on the rear end portion 45a of the left rear mounting section 45 of the sub frame 41 as indicated by arrow A3.

Thus, as shown in FIGS. 29 and 30, the welding nut 32 is detached from the floor frame bottom section 23, by the downward pulling force acting as indicated by arrow A3, to push and expand the mounting hole 28 of the floor frame bottom section 23. Further, the welding nut 32 drops through the expanded mounting hole 28 downward below the floor frame bottom section 23 as indicated by arrow A3.

Consequently, as shown in FIG. 31, the downward pulling force causes the rear fragile part 85 to bend downward. The left sub-frame one end section 51D and the rear fragile part 85 greatly pivot downward about the left connection member 78 as indicated by arrow A4. Thus, the sub frame body 42 greatly moves back while greatly inclining rearwardly and downwardly. As the sub frame body 42 greatly moves rearwardly and downwardly like this, the electric power steering gearbox 71a and the power unit 72 greatly move back along the slanting plate 18 of the lower dashboard panel 16 while greatly inclining rearwardly and downwardly.

The foregoing description about the fifth embodiment can be summarized as follows. Because the sub frame 41D and the left and right sub-frame one end sections 51D are separated from each other as shown in FIGS. 23 and 24, the sub frame 41D can be reduced in size. Further, the through-holes 83 are formed in the left and right end portions 51a of the left and right separated members 51D separated from the sub frame 41D. The left and right through-holes 83 are sized such that they are movable or displaceable relative to the left and right fastener members 31 at least in the vehicle width direction. For example, the left and right through-holes 83 are elongated in the vehicle width direction. The left and right end portions 51a are fastened to the sub frame 41D by means of the fastener members 31 passed through the left and right through-holes 83. Because the through-holes 83 are elongated in the vehicle width direction, the instant embodiment can absorb size tolerance, in the vehicle width direction, of the left and right separated members 51D to the sub frame 41D. Thus, the left and right separated members 51D can be readily assembled to the sub frame 41D.

Embodiment 6

Figure 20:
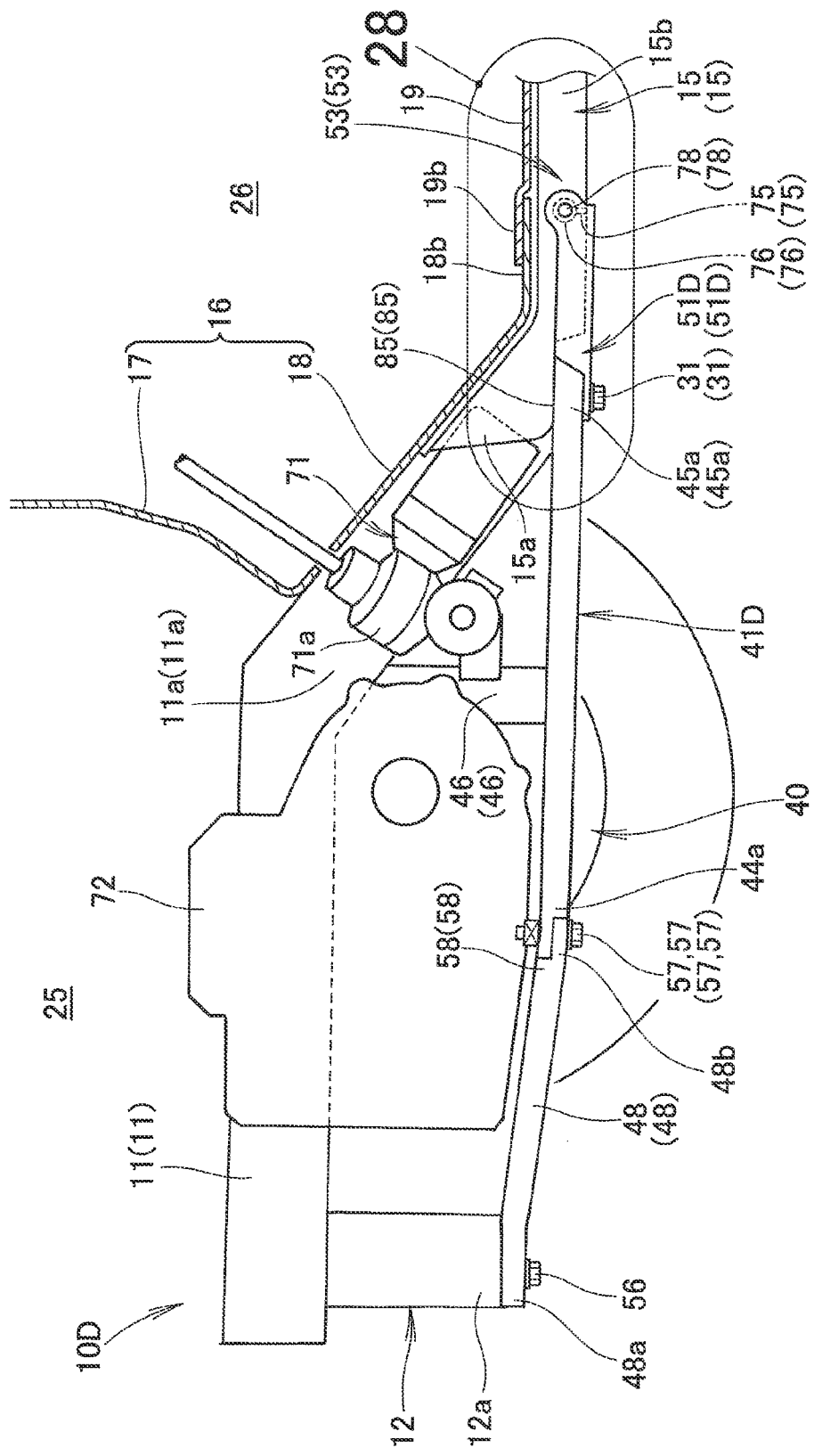
FIG. 20 is an exploded view showing relationship among the left floor frame, the sub frame and the lower dashboard panel shown in FIG. 19.
Figure 32:
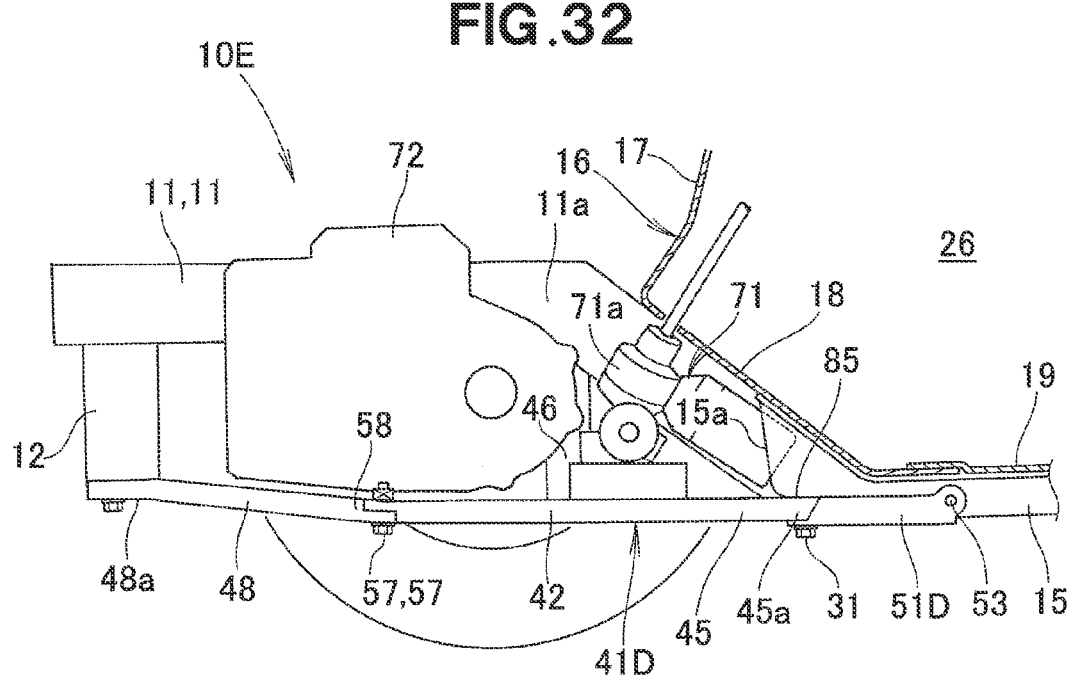
FIG. 32 is a left side sectional view showing relationship among the left floor frame, the sub frame and the lower dashboard panel shown in a sixth embodiment of the present invention.
Figure 33:
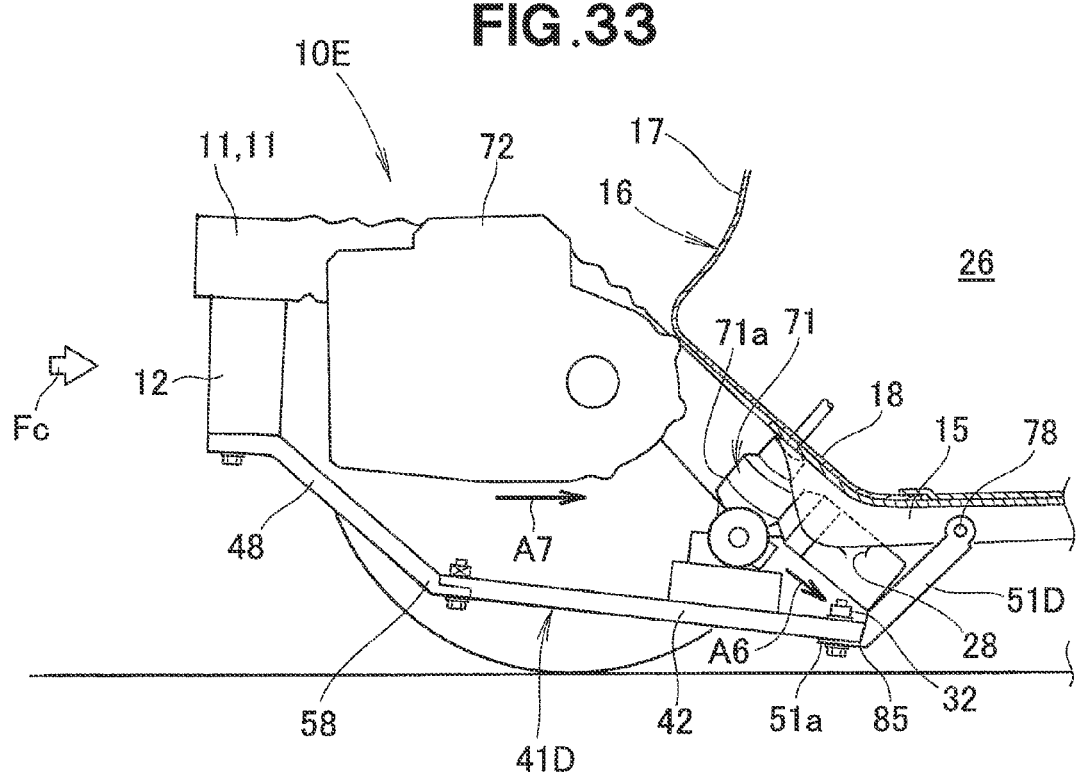
FIG. 33 is a view explanatory of an example manner in which the vehicle body structure absorbs a collision force having acted on the front section of the vehicle body shown in FIG. 32.

The following describe, with reference to FIGS. 32 and 33, a sixth embodiment of the vehicle body structure of the present invention. The vehicle body 10E in the sixth embodiment of the vehicle body structure is substantially of the same construction as the vehicle body 10 in the fifth embodiment of the vehicle body structure, except that the section to which the power unit 72 is mounted in the fifth embodiment of FIG. 20 is modified from the corresponding section in the fifth embodiment. The other components of the vehicle body 10E in the sixth embodiment are substantially identical in construction to the corresponding components of the vehicle body 10D in the fifth embodiment of the vehicle body structure and represented by the same reference numerals as the corresponding components of the vehicle body 10 in the fifth embodiment, and these other components of the vehicle body in the sixth embodiment will not be described here to avoid unnecessary duplication.

The sixth embodiment is characterized in that the power unit 72 is mounted on the left and right side frames 11 as shown in FIG. 32. As shown in FIG. 33, when a collision force Fc has been input to the left and right side frames 11, it transmits to the front end portion 48a of the sub frame 41D. In the same manner as in the fifth embodiment shown in FIG. 31, the sub frame 41D deforms rearwardly and downwardly. In response to such movement or displacement of the sub frame 41D, the electric power steering gearbox 71a moves rearwardly and downwardly of the vehicle body 10E as indicated by arrow A6. Thus, the gearbox 71a does not prevent the power unit 72 from moving horizontally rearward as indicated by arrow A7.

Namely, the amount of the horizontal movement of the power unit 72 can be increased. By the power unit 72 greatly moving rearward as indicated by arrow A7 like this, the left and right side frames 11 can sufficiently absorb the collision force Fc input from the front of the vehicle body.

Note that, in the present invention, the connection member 78 of the pivot mechanism 53 is not necessarily limited to the bolt as shown in FIG. 9 and may for example be a rod.

Further, the collar support wall section 93, 93A may be of other than the substantially reversed trapezoidal shape as shown in FIG. 9, such as a rectangular shape.

Figure 27:
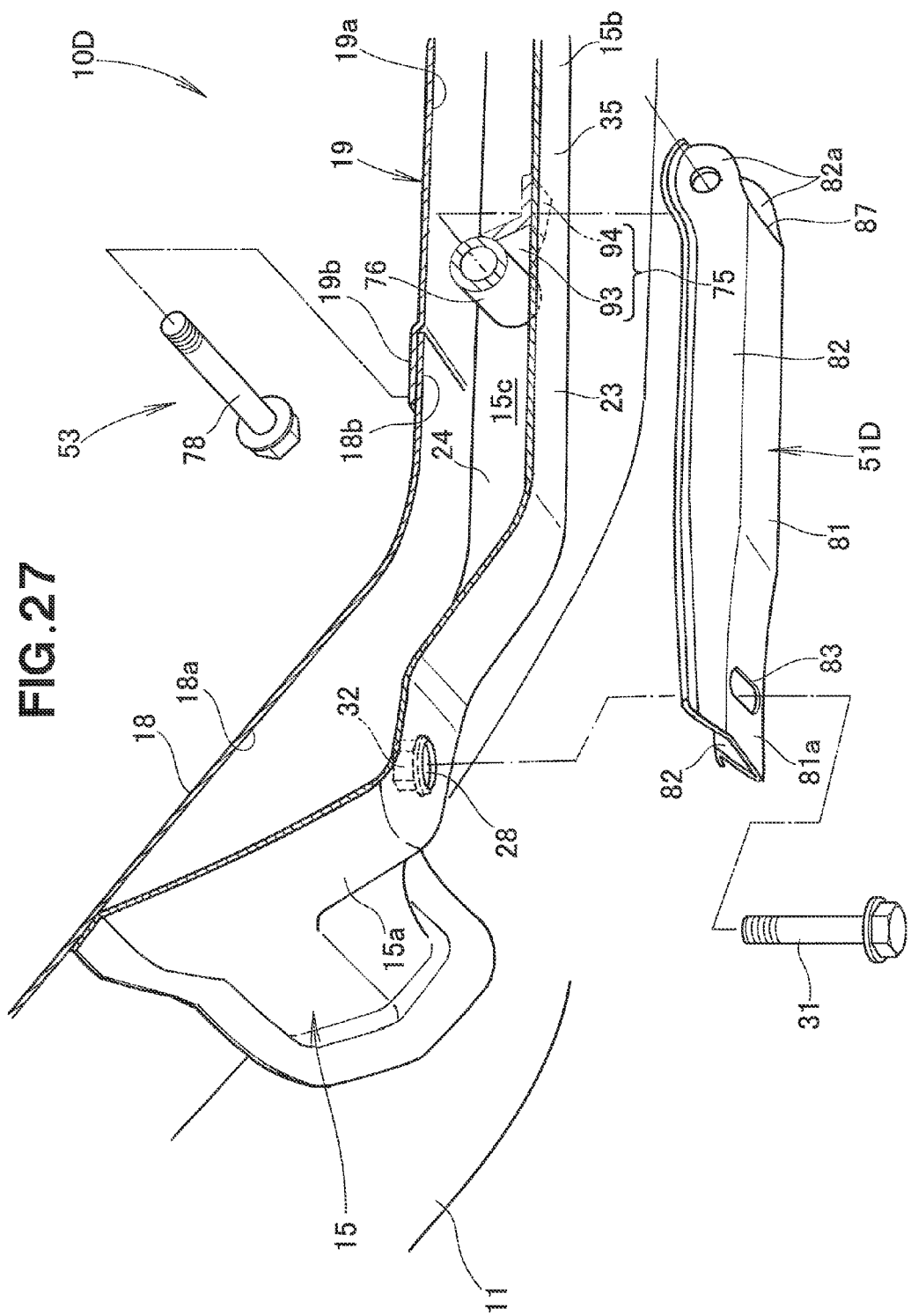
FIG. 27 is a partly broken-away exploded view showing principal elements in the connection of the left sub-frame one end section to the left floor frame shown in FIG. 22.
Figure 28:
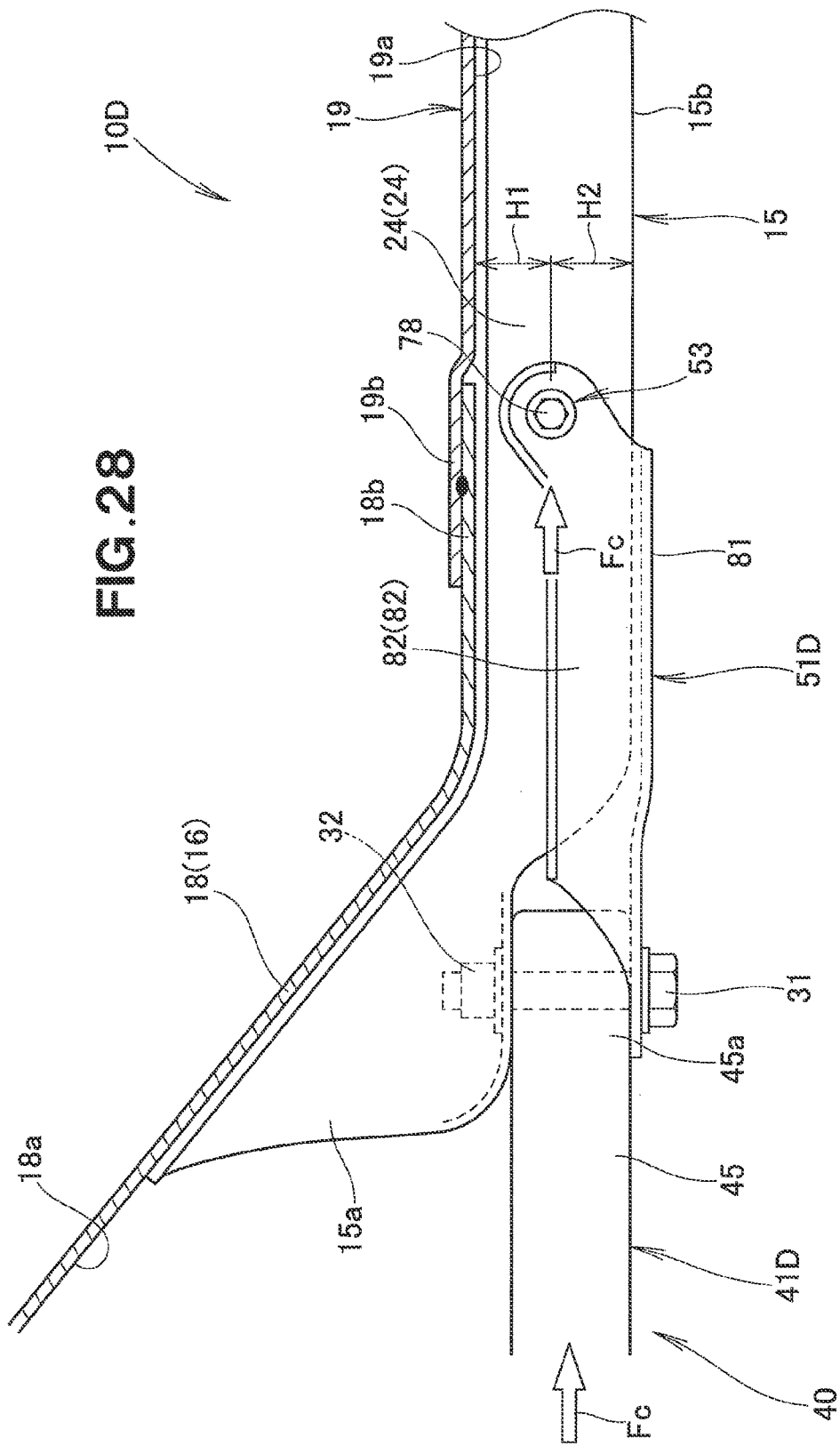
FIG. 28 is a view showing in enlarged scale a section encircled at 28 in FIG. 20.

Further, the through-hole 83 shown in FIGS. 26 and 27 only has to be set to a size such that it is displaceable relative to the fastener member 31 at least in the vehicle width direction. For example, the through-hole 83 may be a circular hole greater in size than the bolt diameter D1.

INDUSTRIAL APPLICABILITY

The vehicle body structure of the present invention is suited for application to passenger cars where a sub frame is provided in a front or rear section of the vehicle body.

Legend:

10, 10A-10E . . . vehicle body, 11 . . . side frame, 15 . . . floor frame, 15a . . . one end portion in a front-rear direction (front end portion), 16 . . . lower dashboard panel, 17 . . . partition plate, 18 . . . slanting plate, 19 . . . floor panel, 19a . . . lower surface, 23 . . . floor frame bottom section, 24 . . . floor frame side wall section, 31 . . . fastener member, 41 . . . sub frame, 43 . . . mount section, 51 . . . sub-frame one end section (separated member), 51a . . . left and right end portions separated from the sub frame, 58 . . . front fragile part, 71 . . . electric power steering, 72 . . . power unit, 75, 75A . . . bulkhead, 76, 76A . . . collar section, 78 . . . connection member, 81 . . . sub frame bottom section, 81a . . . distal end portion, 82 . . . sub frame side wall section, 83 . . . through-hole, 85 . . . rear fragile part, Fc . . . collision force

The invention claimed is:

1. A vehicle body structure comprising: left and right floor frames extending in a front-rear direction of a vehicle body for supporting a floor panel; left and right side frames extending in the front-rear direction of the vehicle body away from near respective one end portions, in the front-rear direction, of the left and right floor frames; and a sub frame disposed underneath the left and right side frames, characterized in that the left and right floor frames each have a generally U cross-sectional shape and each include a floor frame bottom section and a pair of floor frame side wall sections projecting upward from opposite side ends, in a vehicle width direction, of the floor frame bottom section, the left and right floor frames each include, in an interior space of the generally U cross-sectional shape, a left or right bulkhead projecting upward from the floor frame bottom section, and a left or right collar section of a hollow shape provided on the left or right bulkhead and extending in the vehicle width direction, the sub frame includes left and right sub-frame one end sections extending toward the one end portions of the left and right floor frames, the left and right sub-frame one end sections each have a generally U cross-sectional shape and include a sub frame bottom section and a pair of sub frame side wall sections projecting upward from opposite side ends, in the vehicle width direction, of the sub frame bottom section, and the pair of sub frame side wall sections of each of the left and right sub-frame one end sections are fitted over the pair of floor frame side wall sections of the left or right floor frame, but also connected to the pair of floor frame side wall sections of the left or right floor frame, by means of a connection member passed through the collar section of the left or right floor frame, in such a manner that the pair of sub frame side wall sections are pivotable in an up-down direction of the vehicle body.

2. The vehicle body structure according to claim 1, wherein the left and right bulkheads each have a lower end joined to the floor frame bottom section of the left or right floor frame, and the left and right collar sections are each joined to an upper end of the left or right bulkhead.

3. The vehicle body structure according to claim 1, wherein the sub frame bottom section of each of the left and right sub-frame one end sections has a distal end portion opposed to the one end portion of the left or right floor frame, the distal end portion being recessed.

4. The vehicle body structure according to claim 1, which further comprises a lower dashboard panel disposed in front of the floor panel for partitioning the vehicle body in the front-rear direction, and wherein the lower dashboard panel includes a vertically oriented partition plate formed to partition the vehicle body in the front-rear direction, and a slanting plate slanting rearwardly and downwardly from a lower end of the partition plate, the sub frame includes, on front and rear portions thereof, front and rear fragile parts capable of bending downwardly of the vehicle body by a collision force input from a front of the vehicle body toward a rear of the vehicle body, and the sub frame is disposed in front of the lower dashboard panel and includes, between the front and rear fragile parts, a mount section capable of mounting thereon an electric power steering gearbox disposed in front of the slanting plate and a power unit disposed in front of the gearbox.

5. The vehicle body structure according to claim 4, wherein the slanting plate has a lower end joined to a front end portion of the floor panel, the left and right floor frames extend from their respective front end portions, joined to the slanting plate, toward the rear of the vehicle body along a lower surface of the floor panel, and the left and right collar sections are located near the front end portions of the left and right floor frames.

6. The vehicle body structure according to claim 1, wherein the left and right sub-frame one end sections comprise left and right separated members that are separated from the sub frame in the front-rear direction of the vehicle body, the left and right separated members have through-holes formed in the sub frame bottom sections of left and right end sections separated from the sub frame, the left and right end sections are fastened to the sub frame by means of fastener members inserted through the through-holes of the left and right separated members, and the through-holes of the left and right separated members are sized to be displaceable at least in the vehicle width direction relative to corresponding ones of the fastener members.

7. The vehicle body structure according to claim 2, wherein the sub frame bottom section of each of the left and right sub-frame one end sections has a distal end portion opposed to the one end portion of the left or right floor frame, the distal end portion being recessed.

8. The vehicle body structure according to claim 2, which further comprises a lower dashboard panel disposed in front of the floor panel for partitioning the vehicle body in the front-rear direction, and wherein the lower dashboard panel includes a vertically oriented partition plate formed to partition the vehicle body in the front-rear direction, and a slanting plate slanting rearwardly and downwardly from a lower end of the partition plate, the sub frame includes, on front and rear portions thereof, front and rear fragile parts capable of bending downwardly of the vehicle body by a collision force input from a front of the vehicle body toward a rear of the vehicle body, and the sub frame is disposed in front of the lower dashboard panel and includes, between the front and rear fragile parts, a mount section capable of mounting thereon an electric power steering gearbox disposed in front of the slanting plate and a power unit disposed in front of the gearbox.

9. The vehicle body structure according to claim 8, wherein the slanting plate has a lower end joined to a front end portion of the floor panel, the left and right floor frames extend from their respective front end portions, joined to the slanting plate, toward the rear of the vehicle body along a lower surface of the floor panel, and the left and right collar sections are located near the front end portions of the left and right floor frames.

10. The vehicle body structure according to claim 3, which further comprises a lower dashboard panel disposed in front of the floor panel for partitioning the vehicle body in the front-rear direction, and wherein the lower dashboard panel includes a vertically oriented partition plate formed to partition the vehicle body in the front-rear direction, and a slanting plate slanting rearwardly and downwardly from a lower end of the partition plate, the sub frame includes, on front and rear portions thereof, front and rear fragile parts capable of bending downwardly of the vehicle body by a collision force input from a front of the vehicle body toward a rear of the vehicle body, and the sub frame is disposed in front of the lower dashboard panel and includes, between the front and rear fragile parts, a mount section capable of mounting thereon an electric power steering gearbox disposed in front of the slanting plate and a power unit disposed in front of the gearbox.

11. The vehicle body structure according to claim 10, wherein the slanting plate has a lower end joined to a front end portion of the floor panel, the left and right floor frames extend from their respective front end portions, joined to the slanting plate, toward the rear of the vehicle body along a lower surface of the floor panel, and the left and right collar sections are located near the front end portions of the left and right floor frames.

12. The vehicle body structure according to claim 2, wherein the left and right sub-frame one end sections comprise left and right separated members that are separated from the sub frame in the front-rear direction of the vehicle body, the left and right separated members have through-holes formed in the sub frame bottom sections of left and right end sections separated from the sub frame, the left and right end sections are fastened to the sub frame by means of fastener members inserted through the through-holes of the left and right separated members, and the through-holes of the left and right separated members are sized to be displaceable at least in the vehicle width direction relative to corresponding ones of the fastener members.

13. The vehicle body structure according to claim 3, wherein the left and right sub-frame one end sections comprise left and right separated members that are separated from the sub frame in the front-rear direction of the vehicle body, the left and right separated members have through-holes formed in the sub frame bottom sections of left and right end sections separated from the sub frame, the left and right end sections are fastened to the sub frame by means of fastener members inserted through the through-holes of the left and right separated members, and the through-holes of the left and right separated members are sized to be displaceable at least in the vehicle width direction relative to corresponding ones of the fastener members.

14. The vehicle body structure according to claim 4, wherein the left and right sub-frame one end sections comprise left and right separated members that are separated from the sub frame in the front-rear direction of the vehicle body, the left and right separated members have through-holes formed in the sub frame bottom sections of left and right end sections separated from the sub frame, the left and right end sections are fastened to the sub frame by means of fastener members inserted through the through-holes of the left and right separated members, and the through-holes of the left and right separated members are sized to be displaceable at least in the vehicle width direction relative to corresponding ones of the fastener members.

15. The vehicle body structure according to claim 5, wherein the left and right sub-frame one end sections comprise left and right separated members that are separated from the sub frame in the front-rear direction of the vehicle body, the left and right separated members have through-holes formed in the sub frame bottom sections of left and right end sections separated from the sub frame, the left and right end sections are fastened to the sub frame by means of fastener members inserted through the through-holes of the left and right separated members, and the through-holes of the left and right separated members are sized to be displaceable at least in the vehicle width direction relative to corresponding ones of the fastener members.

16. A vehicle body structure comprising: left and right floor frames extending in a front-rear direction of a vehicle body for supporting a floor panel; left and right side frames extending in the front-rear direction of the vehicle body away from near respective one end portions, in the front-rear direction, of the left and right floor frames; and a sub frame disposed underneath the left and right side frames, characterized in that the left and right floor frames each have a generally U cross-sectional shape and each include a floor frame bottom section and a pair of floor frame side wall sections projecting upward from opposite side ends, in a vehicle width direction, of the floor frame bottom section, the left and right floor frames each include, in an interior space of the generally U cross-sectional shape, a left or right collar section of a hollow shape extending in the vehicle width direction, the sub frame includes left and right sub-frame one end sections extending toward the one end portions of the left and right floor frames, the left and right sub-frame one end sections each have a generally U cross-sectional shape and include a sub frame bottom section and a pair of sub frame side wall sections projecting upward from opposite side ends, in the vehicle width direction, of the sub frame bottom section, and the pair of sub frame side wall sections of each of the left and right sub-frame one end sections are fitted over the pair of floor frame side wall sections of the left or right floor frame, but also connected to the pair of floor frame side wall sections of the left or right floor frame, by means of a connection member passed through the collar section of the left or right floor frame, in such a manner that the pair of sub frame side wall sections are pivotable in an up-down direction of the vehicle body.

* * * * *